US008027899B2

(12) United States Patent
Asher et al.

(10) Patent No.: US 8,027,899 B2
(45) Date of Patent: Sep. 27, 2011

(54) SYSTEM AND METHOD FOR FORMING A FINANCIAL INSTRUMENT INDEXED TO ENTERTAINMENT REVENUE

(75) Inventors: Joseph M. Asher, New York, NY (US); Howard W. Lutnick, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

(21) Appl. No.: 12/823,337

(22) Filed: Jun. 25, 2010

(65) Prior Publication Data

US 2010/0262533 A1 Oct. 14, 2010

Related U.S. Application Data

(63) Continuation of application No. 12/408,370, filed on Mar. 20, 2009, now Pat. No. 7,774,258, which is a continuation of application No. 10/914,706, filed on Aug. 9, 2004, now Pat. No. 7,567,931.

(60) Provisional application No. 60/537,325, filed on Jan. 16, 2004.

(51) Int. Cl.
*G06Q 40/00* (2006.01)

(52) U.S. Cl. ................ 705/36 R; 705/38; 705/37; 725/1

(58) Field of Classification Search .................... 705/38, 705/26, 35; 463/17; 725/2
See application file for complete search history.

(56) References Cited

U.S. PATENT DOCUMENTS

| | | | |
|---|---|---|---|
| 3,499,646 | A | 3/1970 | Burgess, Jr. et al. |
| 3,573,747 | A | 4/1971 | Adams et al. |
| 3,581,072 | A | 5/1971 | Nymeyer |
| 4,363,489 | A | 12/1982 | Chodak et al. |
| 4,378,942 | A | 4/1983 | Isaac |
| 4,412,287 | A | 10/1983 | Braddock, III |
| 4,597,046 | A | 6/1986 | Musmanno et al. |
| 4,674,044 | A | 6/1987 | Kalmus et al. |
| 4,823,265 | A | 4/1989 | Nelson |
| 4,874,177 | A | 10/1989 | Girardin |
| 4,903,201 | A | 2/1990 | Wagner |
| 4,918,603 | A | 4/1990 | Hughes et al. |
| 4,962,950 | A | 10/1990 | Champion |
| 4,980,826 | A | 12/1990 | Wagner |
| 5,077,665 | A | 12/1991 | Silverman et al. |

(Continued)

FOREIGN PATENT DOCUMENTS

| | | |
|---|---|---|
| CN | 1417731 | 5/2003 |

(Continued)

OTHER PUBLICATIONS

Leslie Eaton, You to can be rated AAA, The New York Times, Jun. 7, 1998 (AAA).*

(Continued)

*Primary Examiner* — Ella Colbert
*Assistant Examiner* — Chika Ojiaku

(57) ABSTRACT

A method for forming a securities bundle indexed to entertainment revenue includes determining a first funding amount for a first entertainment event. A second funding amount is determined for a second entertainment event. Next, a dividend schedule is determined for the first and second entertainment events. A securities bundle is formed at least partially based on the funding amounts and the dividend schedule, with the securities bundle comprising a first security and a second security. The first security is associated with the first entertainment event and the second security is associated with the second entertainment event.

25 Claims, 5 Drawing Sheets

U.S. PATENT DOCUMENTS

| | | | |
|---|---|---|---|
| 5,101,353 | A | 3/1992 | Lupien et al. |
| 5,108,115 | A | 4/1992 | Berman et al. |
| 5,113,423 | A | 5/1992 | Clark |
| 5,136,501 | A | 8/1992 | Silverman et al. |
| 5,205,827 | A | 4/1993 | Sober |
| 5,237,500 | A | 8/1993 | Perg et al. |
| 5,270,922 | A | 12/1993 | Higgins |
| 5,297,032 | A | 3/1994 | Trojan et al. |
| 5,315,634 | A | 5/1994 | Tanaka et al. |
| 5,375,055 | A | 12/1994 | Togher et al. |
| 5,497,317 | A | 3/1996 | Hawkins et al. |
| 5,508,731 | A | 4/1996 | Kohorn |
| 5,508,913 | A | 4/1996 | Yamamoto et al. |
| 5,537,314 | A | 7/1996 | Kanter |
| 5,557,517 | A | 9/1996 | Daughterty, III |
| 5,573,244 | A | 11/1996 | Mindes |
| 5,586,937 | A | 12/1996 | Menashe |
| 5,689,652 | A | 11/1997 | Lupien et al. |
| 5,692,233 | A | 11/1997 | Garman |
| 5,713,793 | A | 2/1998 | Holte |
| 5,724,524 | A | 3/1998 | Hunt et al. |
| 5,727,165 | A | 3/1998 | Ordish et al. |
| 5,743,525 | A | 4/1998 | Haddad |
| 5,794,219 | A | 8/1998 | Brown |
| 5,799,287 | A | 8/1998 | Dembo |
| 5,806,048 | A | 9/1998 | Kiron et al. |
| 5,819,237 | A | 10/1998 | Garman |
| 5,819,238 | A | 10/1998 | Fernholz |
| 5,826,241 | A | 10/1998 | Stein et al. |
| 5,842,148 | A | 11/1998 | Prendergast et al. |
| 5,845,266 | A | 12/1998 | Lupien et al. |
| 5,846,132 | A | 12/1998 | Junkin |
| 5,888,136 | A | 3/1999 | Herbert |
| 5,905,974 | A | 5/1999 | Fraser et al. |
| 5,913,203 | A | 6/1999 | Wong et al. |
| 5,924,082 | A | 7/1999 | Silverman et al. |
| 5,946,667 | A | 8/1999 | Tull, Jr. et al. |
| 5,950,176 | A | 9/1999 | Keiser et al. |
| 5,950,177 | A | 9/1999 | Lupien et al. |
| 5,970,479 | A | 10/1999 | Shepherd |
| 6,009,402 | A | 12/1999 | Whitworth |
| 6,012,046 | A | 1/2000 | Lupien et al. |
| 6,014,643 | A | 1/2000 | Minton |
| 6,016,483 | A | 1/2000 | Rickard et al. |
| 6,021,397 | A | 2/2000 | Jones et al. |
| 6,023,685 | A | 2/2000 | Brett et al. |
| 6,026,364 | A | 2/2000 | Whitworth |
| 6,026,388 | A | 2/2000 | Liddy et al. |
| 6,029,146 | A | 2/2000 | Hawkins et al. |
| 6,035,287 | A | 3/2000 | Stallaert et al. |
| 6,058,377 | A | 5/2000 | Traub et al. |
| 6,058,379 | A | 5/2000 | Odom et al. |
| 6,064,985 | A | 5/2000 | Anderson |
| 6,067,532 | A | 5/2000 | Gebb |
| 6,088,685 | A | 7/2000 | Kiron |
| 6,112,189 | A | 8/2000 | Rickard et al. |
| 6,113,492 | A | 9/2000 | Walker et al. |
| 6,120,376 | A | 9/2000 | Cherry |
| 6,126,543 | A | 10/2000 | Friedman |
| 6,152,822 | A | 11/2000 | Herbert |
| 6,154,730 | A | 11/2000 | Adams et al. |
| 6,236,900 | B1 | 5/2001 | Geiger |
| 6,240,396 | B1 | 5/2001 | Walker et al. |
| 6,260,019 | B1 | 7/2001 | Courts |
| 6,260,024 | B1 | 7/2001 | Shkedy |
| 6,263,321 | B1 | 7/2001 | Daughtery, III |
| 6,263,900 | B1 | 7/2001 | Geiger |
| 6,278,981 | B1 | 8/2001 | Dembo et al. |
| 6,296,569 | B1 | 10/2001 | Congello, Jr. |
| 6,309,307 | B1 | 10/2001 | Krause et al. |
| 6,325,721 | B1 | 12/2001 | Miyamoto et al. |
| 6,331,148 | B1 | 12/2001 | Krause et al. |
| 6,347,086 | B1 | 2/2002 | Strachan |
| 6,358,150 | B1 | 3/2002 | Mir et al. |
| 6,360,210 | B1 | 3/2002 | Wallman |
| 6,371,855 | B1 | 4/2002 | Gavriloff |
| 6,418,417 | B1 | 7/2002 | Corby et al. |
| 6,443,841 | B1 | 9/2002 | Rossides |
| 6,450,887 | B1 | 9/2002 | Mir et al. |
| 0,143,676 | A1 | 10/2002 | Kiron et al. |
| 6,470,324 | B1 | 10/2002 | Brown et al. |
| 6,482,091 | B1 | 11/2002 | Kobayashi et al. |
| 6,505,174 | B1 | 1/2003 | Keiser et al. |
| 6,527,270 | B2 | 3/2003 | Maksymec et al. |
| 6,578,010 | B1 | 6/2003 | Teacherson |
| 6,598,028 | B1 | 7/2003 | Sullivan et al. |
| 6,669,565 | B2 | 12/2003 | Liegey |
| 6,688,978 | B1 | 2/2004 | Herman |
| 6,692,916 | B2 | 2/2004 | Bevilacqua et al. |
| 6,711,550 | B1 | 3/2004 | Lewis et al. |
| 6,792,411 | B1 | 9/2004 | Massey, Jr. |
| 6,837,791 | B1 | 1/2005 | Ramsey et al. |
| 6,910,965 | B2 | 6/2005 | Downes |
| 6,925,446 | B2 | 8/2005 | Watanabe |
| 6,939,137 | B1 | 9/2005 | Colaio et al. |
| 7,001,279 | B1 | 2/2006 | Barber et al. |
| 7,003,485 | B1 | 2/2006 | Young |
| 7,006,991 | B2 | 2/2006 | Keiser et al. |
| 7,031,938 | B2 | 4/2006 | Fraivillig et al. |
| 7,062,457 | B1 | 6/2006 | Kaufman |
| 7,076,459 | B2 | 7/2006 | Zhang et al. |
| 7,099,838 | B1 | 8/2006 | Gastineau et al. |
| 7,099,839 | B2 | 8/2006 | Madoff et al. |
| 7,110,961 | B1 | 9/2006 | Goino |
| 7,124,106 | B1 | 10/2006 | Stallaert et al. |
| 7,146,334 | B2 | 12/2006 | Hogg et al. |
| 7,152,041 | B2 | 12/2006 | Salavadori et al. |
| 7,162,447 | B1 | 1/2007 | Cushing |
| 7,171,385 | B1 | 1/2007 | Dembo et al. |
| 7,171,386 | B1 | 1/2007 | Raykhman |
| 7,172,508 | B2 | 2/2007 | Simon et al. |
| 7,174,517 | B2 | 2/2007 | Barnett et al. |
| 7,236,955 | B2 | 6/2007 | Sugahara |
| 7,249,081 | B2 | 7/2007 | Shearer et al. |
| 7,263,504 | B2 | 8/2007 | Galai et al. |
| 7,321,871 | B2 | 1/2008 | Scott et al. |
| 7,340,425 | B2 | 3/2008 | Boyle et al. |
| 7,395,232 | B1 | 7/2008 | Pilato |
| 7,409,367 | B2 | 8/2008 | McGill et al. |
| 7,438,640 | B2 | 10/2008 | Amour |
| 7,451,104 | B1 | 11/2008 | Hendrix |
| 7,487,123 | B1 | 2/2009 | Keiser et al. |
| 7,567,931 | B2 | 7/2009 | Asher et al. |
| 7,567,935 | B2 | 7/2009 | Tell et al. |
| 7,571,130 | B2 | 8/2009 | Weber et al. |
| 7,641,549 | B2 | 1/2010 | Asher et al. |
| 7,818,225 | B2 | 10/2010 | Gula |
| 2001/0003099 | A1 | 6/2001 | Von Kohorn |
| 2001/0039209 | A1 | 11/2001 | DeWeese et al. |
| 2001/0042785 | A1 | 11/2001 | Walker et al. |
| 2001/0047291 | A1 | 11/2001 | Garahi et al. |
| 2002/0019792 | A1 | 2/2002 | Maerz et al. |
| 2002/0023035 | A1 | 2/2002 | Kiron et al. |
| 2002/0023037 | A1 | 2/2002 | White |
| 2002/0026390 | A1 | 2/2002 | Ulenas et al. |
| 2002/0032641 | A1 | 3/2002 | Mendiola et al. |
| 2002/0038270 | A1 | 3/2002 | Shin et al. |
| 2002/0062243 | A1 | 5/2002 | Anderson |
| 2002/0068633 | A1 | 6/2002 | Schlaifer |
| 2002/0073021 | A1 | 6/2002 | Ginsberg et al. |
| 2002/0077880 | A1 | 6/2002 | Gordon et al. |
| 2002/0082969 | A1 | 6/2002 | O'Keeffe et al. |
| 2002/0087447 | A1 | 7/2002 | McDonald et al. |
| 2002/0094869 | A1 | 7/2002 | Harkham |
| 2002/0095369 | A1 | 7/2002 | Kaplan et al. |
| 2002/0099640 | A1 | 7/2002 | Lange |
| 2002/0112014 | A1 | 8/2002 | Bennett et al. |
| 2002/0115488 | A1 | 8/2002 | Berry et al. |
| 2002/0119793 | A1 | 8/2002 | Hronek et al. |
| 2002/0120490 | A1 | 8/2002 | Gajewski et al. |
| 2002/0128951 | A1 | 9/2002 | Kiron et al. |
| 2002/0152458 | A1 | 10/2002 | Eyer et al. |
| 2002/0153656 | A1 | 10/2002 | Maksymec et al. |
| 2002/0156715 | A1 | 10/2002 | Wall et al. |
| 2002/0161622 | A1 | 10/2002 | Zhang et al. |
| 2002/0194097 | A1 | 12/2002 | Reitz |
| 2003/0008711 | A1 | 1/2003 | Corbo |

| | | | | |
|---|---|---|---|---|
| 2003/0009415 | A1* | 1/2003 | Lutnick et al. | 705/37 |
| 2003/0018564 | A1 | 1/2003 | Bonnier et al. | |
| 2003/0018571 | A1 | 1/2003 | Eckert et al. | |
| 2003/0036395 | A1 | 2/2003 | Proidi | |
| 2003/0036396 | A1 | 2/2003 | Back et al. | |
| 2003/0061096 | A1 | 3/2003 | Gallivan et al. | |
| 2003/0065615 | A1 | 4/2003 | Aschir | |
| 2003/0093356 | A1 | 5/2003 | Kaufman | |
| 2003/0101128 | A1 | 5/2003 | Abernethy | |
| 2003/0130941 | A1 | 7/2003 | Birle | |
| 2003/0154092 | A1 | 8/2003 | Bouron et al. | |
| 2003/0171980 | A1 | 9/2003 | Keiser et al. | |
| 2003/0172026 | A1 | 9/2003 | Tarrant | |
| 2003/0177055 | A1 | 9/2003 | Zimmerman, Jr. et al. | |
| 2003/0199315 | A1 | 10/2003 | Downes | |
| 2003/0200164 | A1 | 10/2003 | Jacobs | |
| 2003/0204408 | A1 | 10/2003 | Guler et al. | |
| 2003/0212623 | A1 | 11/2003 | Aylmer et al. | |
| 2003/0236734 | A1 | 12/2003 | Guler et al. | |
| 2004/0015427 | A1 | 1/2004 | Camelio | |
| 2004/0039685 | A1 | 2/2004 | Hambrecht et al. | |
| 2004/0049447 | A1 | 3/2004 | Keiser et al. | |
| 2004/0059646 | A1 | 3/2004 | Harrington et al. | |
| 2004/0059660 | A1 | 3/2004 | Michael | |
| 2004/0068738 | A1 | 4/2004 | Kinoshita | |
| 2004/0078268 | A1 | 4/2004 | Sprogis | |
| 2004/0078314 | A1 | 4/2004 | Maerz et al. | |
| 2004/0088242 | A1 | 5/2004 | Ascher et al. | |
| 2004/0088244 | A1 | 5/2004 | Bartter et al. | |
| 2004/0110552 | A1 | 6/2004 | Del Prado | |
| 2004/0111358 | A1 | 6/2004 | Lange et al. | |
| 2004/0117302 | A1 | 6/2004 | Weichert et al. | |
| 2004/0138977 | A1 | 7/2004 | Tomkins et al. | |
| 2004/0143530 | A1 | 7/2004 | Galai et al. | |
| 2004/0153375 | A1 | 8/2004 | Mukunya et al. | |
| 2004/0171381 | A1 | 9/2004 | Inselberg | |
| 2004/0192437 | A1 | 9/2004 | Amaitis et al. | |
| 2004/0193469 | A1 | 9/2004 | Amaitis et al. | |
| 2004/0193531 | A1 | 9/2004 | Amaitis et al. | |
| 2004/0199450 | A1 | 10/2004 | Johnston et al. | |
| 2004/0199459 | A1 | 10/2004 | Johnston et al. | |
| 2004/0199471 | A1 | 10/2004 | Hardjono | |
| 2004/0204245 | A1 | 10/2004 | Amaitis et al. | |
| 2004/0210507 | A1 | 10/2004 | Asher et al. | |
| 2004/0225554 | A1 | 11/2004 | Chiappetta et al. | |
| 2004/0229671 | A1 | 11/2004 | Stronach et al. | |
| 2004/0243504 | A1 | 12/2004 | Asher et al. | |
| 2004/0260575 | A1 | 12/2004 | Massey, Jr. | |
| 2004/0267657 | A1 | 12/2004 | Hecht | |
| 2005/0010487 | A1 | 1/2005 | Weisbach et al. | |
| 2005/0021441 | A1 | 1/2005 | Flake et al. | |
| 2005/0021445 | A1 | 1/2005 | Caro | |
| 2005/0027583 | A1 | 2/2005 | Smit et al. | |
| 2005/0027643 | A1 | 2/2005 | Amaitis et al. | |
| 2005/0038706 | A1 | 2/2005 | Yazdani et al. | |
| 2005/0044025 | A1 | 2/2005 | Tutty et al. | |
| 2005/0049731 | A1 | 3/2005 | Dell | |
| 2005/0055302 | A1 | 3/2005 | Wenger et al. | |
| 2005/0064937 | A1 | 3/2005 | Ballman | |
| 2005/0070251 | A1 | 3/2005 | Satake et al. | |
| 2005/0071250 | A1 | 3/2005 | Weisbach et al. | |
| 2005/0080705 | A1 | 4/2005 | Chaganti | |
| 2005/0097022 | A1 | 5/2005 | Silman | |
| 2005/0102215 | A1 | 5/2005 | Ausubel et al. | |
| 2005/0108131 | A1 | 5/2005 | Halikias | |
| 2005/0125333 | A1 | 6/2005 | Giannetti | |
| 2005/0154629 | A1 | 7/2005 | Matsuda et al. | |
| 2005/0160020 | A1 | 7/2005 | Asher et al. | |
| 2005/0160024 | A1 | 7/2005 | Soderborg et al. | |
| 2005/0160028 | A1 | 7/2005 | Asher et al. | |
| 2005/0160029 | A1 | 7/2005 | Asher et al. | |
| 2005/0209954 | A1 | 9/2005 | Asher et al. | |
| 2005/0267836 | A1 | 12/2005 | Crosthwaite et al. | |
| 2006/0003830 | A1 | 1/2006 | Walker et al. | |
| 2006/0025208 | A1 | 2/2006 | Ramsey | |
| 2006/0026091 | A1 | 2/2006 | Keen, Jr. et al. | |
| 2006/0069635 | A1 | 3/2006 | Ram et al. | |
| 2006/0080220 | A1 | 4/2006 | Samuel et al. | |
| 2006/0085320 | A1 | 4/2006 | Owens et al. | |
| 2006/0100006 | A1 | 5/2006 | Mitchell et al. | |
| 2006/0105840 | A1 | 5/2006 | Graeve | |
| 2006/0116950 | A1 | 6/2006 | Poffenberger et al. | |
| 2006/0123092 | A1 | 6/2006 | Madams et al. | |
| 2006/0143099 | A1 | 6/2006 | Partlow et al. | |
| 2006/0143110 | A1 | 6/2006 | Keiser et al. | |
| 2006/0173761 | A1 | 8/2006 | Costakis | |
| 2006/0173764 | A1 | 8/2006 | Costakis et al. | |
| 2006/0195355 | A1 | 8/2006 | Lundgren | |
| 2006/0235783 | A1 | 10/2006 | Ryles et al. | |
| 2006/0240852 | A1 | 10/2006 | Al-Sarawi | |
| 2006/0259312 | A1 | 11/2006 | De Titta | |
| 2006/0259381 | A1 | 11/2006 | Gershon | |
| 2006/0277135 | A1 | 12/2006 | Jain et al. | |
| 2006/0293985 | A1 | 12/2006 | Lederman et al. | |
| 2006/0293995 | A1 | 12/2006 | Borgs et al. | |
| 2007/0010314 | A1 | 1/2007 | Tulley et al. | |
| 2007/0054718 | A1 | 3/2007 | Del Prado | |
| 2007/0060380 | A1 | 3/2007 | McMonigle et al. | |
| 2007/0061240 | A1 | 3/2007 | Jain et al. | |
| 2007/0073608 | A1 | 3/2007 | Garcia | |
| 2007/0087815 | A1* | 4/2007 | Van Luchene | 463/25 |
| 2007/0087816 | A1* | 4/2007 | VanLuchene | 463/25 |
| 2007/0100729 | A1 | 5/2007 | Chen | |
| 2007/0130040 | A1* | 6/2007 | Stinski | 705/36 R |
| 2007/0136074 | A1 | 6/2007 | Hahn et al. | |
| 2007/0174171 | A1 | 7/2007 | Sheffield | |
| 2007/0207849 | A1* | 9/2007 | Asher et al. | 463/19 |
| 2007/0208642 | A1* | 9/2007 | Asher et al. | 705/35 |
| 2007/0298871 | A1* | 12/2007 | Asher et al. | 463/25 |
| 2008/0015969 | A1* | 1/2008 | Mowshowitz | 705/37 |
| 2008/0026825 | A1* | 1/2008 | Yoshioka | 463/25 |
| 2008/0032786 | A1* | 2/2008 | Hosokawa | 463/25 |
| 2008/0088087 | A1* | 4/2008 | Weitzman et al. | 273/292 |
| 2008/0183611 | A1* | 7/2008 | Frischer | 705/37 |
| 2008/0195459 | A1* | 8/2008 | Stinski | 705/10 |
| 2008/0200242 | A1* | 8/2008 | Ginsberg et al. | 463/25 |
| 2008/0207297 | A1* | 8/2008 | Zilba | 463/16 |
| 2008/0275824 | A1* | 11/2008 | Assia et al. | 705/36 R |
| 2009/0017905 | A1* | 1/2009 | Meckenzie et al. | 463/26 |
| 2009/0061995 | A1* | 3/2009 | Assia et al. | 463/25 |
| 2009/0062016 | A1* | 3/2009 | Assia et al. | 463/42 |
| 2009/0186689 | A1* | 7/2009 | Hughes et al. | 463/25 |
| 2009/0210335 | A1 | 8/2009 | Asher et al. | |
| 2009/0247286 | A1* | 10/2009 | Inamura | 463/25 |
| 2010/0160012 | A1* | 6/2010 | Amaitis et al. | 463/2 |
| 2010/0173697 | A1* | 7/2010 | Van Luchene | 463/25 |
| 2010/0197382 | A1* | 8/2010 | Van Luchene | 463/25 |
| 2010/0210335 | A1* | 8/2010 | Goto et al. | 463/16 |

FOREIGN PATENT DOCUMENTS

| | | |
|---|---|---|
| DE | 3539545 | 11/1985 |
| EP | 0 739 526 | 10/1995 |
| EP | 1 132 836 | 9/2001 |
| EP | 1 363 430 | 5/2002 |
| GB | 2180675 | 4/1987 |
| GB | 2299425 | 10/1996 |
| GB | 1574447 | 9/2008 |
| JP | 2002049789 | 2/2002 |
| KR | 2001065086 | 7/2001 |
| KR | 2001098204 | 11/2001 |
| KR | 2002042036 | 6/2002 |
| KR | 2004-0062806 | 7/2004 |
| WO | WO 93/10503 | 11/1992 |
| WO | WO 96/41315 | 3/1996 |
| WO | WO 98/58333 | 6/1998 |
| WO | WO 01/16825 | 6/2000 |
| WO | WO 01/98983 | 6/2000 |
| WO | WO 01/39056 | 11/2000 |
| WO | WO 00/79442 A1 | 12/2000 |
| WO | WO 02/12986 | 8/2001 |
| WO | WO 01/77861 | 10/2001 |
| WO | WO 01/77940 | 10/2001 |
| WO | WO 01/77964 A2 | 10/2001 |
| WO | WO 02/46999 | 11/2001 |
| WO | WO 02/25547 | 3/2002 |
| WO | WO 03/010720 | 7/2002 |
| WO | WO 03/100567 | 12/2003 |
| WO | WO2004/031899 | 4/2004 |

WO WO 2004/090681 A3 10/2004
WO WO2005/001728 1/2005
WO WO 2005/017700 2/2005

OTHER PUBLICATIONS

Leslie M. Fairfax, When you Wish upon a Star: Explaining the Cautious Growth of Royality Backed Securitization, Columbia Business Law Review (Star).*
Thomas S. Gruca, Joyce Berg and Mike Cipriano, , The Effect of Electronic Markets on Forecasts of New Product Success Information Systems Frontiers, 5:1, 95-105, 2003 (Electronic Markets).*
Hakansson, Nils H., et al., "On the Feasibility of Automated Market Making by a Programmed Specialist," The Journal of Finance, vol. 40, No. I, pp. 1-20, dated Mar. 1985.
Howard, Barbara, "The trade: Technology Aims to Take the Final Step," Institutional Investor, vol. XXV, No. 1, p. 15, dated Jan. 1991.
Freund, William C., "Trading Stock Around the Clock: The Future Growth of Global Electronic Markets," California Management Review, vol. 34, No. 1, pp. 87-102, dated 1991.
Lindsey, Richard R., et al., "*Specialist* v. *Saitori*: Market-Making in New York and Tokyo," Financial Analysts Journal, vol. 48, No. 4, pp. 48-57, dated Jul./Aug. 1992.
Chan, K.C., et al., "Market Structure and the Intraday Pattern of Bid-Ask Spreads for Nasdaq Securities," The Journal of Business, vol. 68, No. 1, ISSN: 0021-9398, 12 pages, dated Jan. 1995.
Ye, Jia, An Investigation of Market Fragmentation and the Specialist's Quotation Strategy, Dissertation Abstracts International, vol. 57, No. 3, p. 1260-A, dated Aug. 1995.
Bloomfield, Robert, "The Interdependence of Reporting Discretion and Informational Efficiency in Laboratory Markets," The Accounting Review, vol. 71, No. 4, pp. 493-511, dated Oct. 1996.
Schrage, Michael, '(Firms Quietly Forming Own Economies, San Jose Mercury News, 2 Pages, dated Jul. 13, 1992.
Astral Media, "The Harold Greenberg Fund's Equity Investment Program", 11 pages, dated 1992.
Avary's Domain—Interviews—Miltimeter Magazine Interview, pp. 9-10, dated Mar. 3, 1994.
Lewis, Peter H., "Attention Internet Shoppers: E-Cash is Here," The New York Times, Section D, p. 4, col. 4, 2 pages, dated Oct. 19, 1994.
Digital Commerce on Increase, Publishing Technology Review, vol. 2, No. 2, ISSN: 1351-0177, 1 page, dated Jan. 1, 1995.
Hansell, Saul, "Today, Shoppers on Internet Get Access to Electronic Cash," The New York Times, Section D, p. 4, col. 5, 2 pages, dated Oct. 23, 1995.
Cones, John W., "43 Ways to Finance Your Feature Film", A Comprehensive Analysis of Film Finance, 14 pages, dated 1995.
Nash, Kim S., "Cybercash at Risk: Money Laws Lacking," Computerworld, 3 pages, dated Dec. 23, 1996.
The Rogue Market Journal, "The Power Play on Popular Culture, A Letter from the Editor", 18 pages, dated Dec. 30, 1996.
Chang, Yahlin, "The Internet: Bull Market in Movies," Newsweek, 1 page, dated Feb. 3, 1997.
Dubin, Alex, "Sunspot: Maryland's Online Community, Taking Stock at the Box Office," 5 pages, dated Aug. 19, 1997.
Engineers, Hollywood Stock Exchange, 2 pages, dated Nov. 13, 1997.
Newman, Jeffrey L., Amex.com, The Street.com, Across the Street: Buying Stock in Hollywood, 2 pages, dated Nov. 17, 1997.
Pedersen-Pietersen, Laura, "The Hollywood Stock Market: You Can't Lose," The New York Times, Section 3, p. 4, col. 1, 3 pages, dated Jan. 11, 1998.
Kelly, Brendan, Variety: Canadians turn to co-finance, pre-sales for TV prod'n. coin. Findarticles.com , 4 pages, dated Jan. 19, 1998.
Ragas, Matthew, OnlinePress.com, Insider Trading—Hollywood Style, 3 pages, dated Feb. 4, 1998.
Smith, Leo, Ventura County Business; Ventura County Review; Ventura Studio Company Expands on Its Multimedia Savvy; The Los Angeles Times, 2 pages., dated Dec. 15, 1998.
Cones, John W. and Wilke, Pete, "Investor Financing of Independent Film" pp. 1-257, dated 1998.
Tuchlin, Harris E., "Smooth Negotiating: Making the Director Deal," International Entertainment, Multimedia & Intellectual Property Law & Business Network, 13 pages, dated 1998.
Feuer, Jack, "Disc Driven," Findarticles.com, 8 pages, dated Jul. 12, 1999.
Film Finances, Inc. The World Leader in Completion Guarantees, Internet print-out, 1 page, dated Nov. 23, 2005.
Findarticles.com, "MediaX and CMC International Records Team Up for Exclusive Download Campaigns with Major Artists." PR Newswire, 2 pages, dated Dec. 9, 1999.
Film Finances, Inc. The World Leader in Completion Guarantees. Sample Completion Guaranty; Aug., 2000 Internet printout (14 pages).
Kaufman, Debra, "Lights, Camera, Capital, Online Investing," Wired Magazine, 2 pages, dated 2001.
American Film Market; Hollwoodnet.com; 1997, http://www.hollywoodnet.com/conferences/aft97.htm.
Klapwald, Thea, "Prod'n co. born from Net game", Special Issue: The Independents; Daily Variety, Jul. 24, 1997, 2pp.
Notification of Transmittal of the International Search Report and Written Opinion of the International Searching Authority, or the Declaration for International Application No. PCT/US04/11206, mailed Jun. 5, 2007, 9 pp.
Notification of Transmittal of the International Search Report and Written Opinion of the International Searching Authority for International Application No. PCT/US07/09389, mailed Nov. 13, 2007, 8 pp.
Christine DeMartini et al., "A New and Improved Design for Multi-Object Iterative Auctions", 45 pp, dated Mar. 15, 1999.
In Science, The Real Power of Artificial Markets, pp. 987-988, dated Feb. 9, 2001.
Net Exchange Speaks at Eye for Energy Conference in Amsterdam, Net Exchange provides insight into evolution of energy trading, 2 pp., dated Mar. 28, 2001.
Net Exchange Architects of Markets, Market Architecture: Improving Markets by Enhancing Choice, 9 pp., May 2001.
Net Exchange Addresses Dash Optimization User Group; Net Exchange disuses the application of optimization software to the commerce function of deal-making, 2pp., dated Nov. 7, 2001.
Charles R. Plott et al.; Division of the Humanities and Social Sciences California Institute of Technology; Information Aggregation Mechanisms: Concept, Design and Implementation for a Sales Forecasting Problem, 34 pp., dated Mar. 2002.
Net Exchange Deploys in the Transportation Procurement Market; Net Exchange's advanced combined value trading framework selected for Schneider Logistics' SUMIT CVA procurement system, 2 pp., Jul. 8, 2002.
John O. Ledyard et al., Interfaces; The First uses of a Combined-Value Auction for Transportation Services; vol. 32, No. 5, pp. 4-12, dated Sep./Oct. 2002.
Joyce E. Berg et al., Information Systems Frontiers; Prediction Markets as Decision Support Systems, pp. 79-93, dated 2003.
Hal R. Varian; The New York Times; Can markets be used to help people make nonmarket decisions?, 3 pp., dated May 8, 2003.
Charles Polk et al; The Policy of Analysis Market: An Electronic Commerce Application of a Combinatorial Information Market; ACM 1-58113-679-X/03/0006, Jun. 9-12, 2003.
Net Exchange Expanding the Value of Commerce; The Policy Analysis Market: "Market in Death" or Your Next Decision Support Tool?, 15 pp., Sep. 9, 2003.
Harvard Business School Working Knowledge; You Can Bet on Idea Markets, 4 pp., dated Dec. 1, 2003.
Justin Wolfers et al., Journal of Economic Perspectives; Prediction Markets; vol. 18, No. 2, pp. 107-126, dated 2004.
James Surowiecki; Wired; Smarter Than the CEO; Issue 12.06; 3 pp., dated Jun. 2004.
Barbara Kiviat; TIME; The End of Management?; 5 pp., dated Jul. 6, 2004.
James M. Pethokoukis; Money & Business; All seeing all knowing, 2pp., Aug. 22, 2004.
Emile Servan-Schreiber et al.; Electronic Markets; Prediction Markets: Does Money Matter?; 11 pp., dated Sep. 2004.

Common Knowledge Markets; Swing State Presidential Prediction Markets; 2 pp., dated Oct. 6, 2004.
Chris Hibbert; CommerceNet Labs Technical Report 05-02; Zocalo: An Open-Source Platform for Deploying Prediction Markets, 21 pp., dated Feb. 2005.
NewsFutures Prediction Markets; Trading uncertainty for collective wisdom, 3 pp., dated Mar. 15, 2005.
Business Week; the Power of Us, Mass Collaboration on the Internet is shaking up business; 6 pp., dated Jun. 20, 2005.
Corey Hajim; Fortune; Making a Market in (almost) anything; pp. 103-106, dated Aug. 8, 2005.
Prediction Markets Blog by Consensus Point; Popular Prediction market Software Becomes Open Source; 3 pp., dated Aug. 29, 2005.
Bill Saporito; TIME; Place Your Bets! On terrorism, on politics, on your future. Why markets will have a say in almost everything; 1 pg., dated Oct. 24, 2005.
Alex Nyberg Stuart; CFO.com; Market Magic, Internal markets can solve thorny allocation problems and predict the future; 3 pp., dated Nov. 1, 2005.
CBS News; The Crowd Knows Best; 2 pp., dated Jan. 8, 2006.
Prediction Markets Blog by Consensus Point; Foresight Technologies Changes Name to 'Consensus Point'; 3 pp., Jan. 30, 2006.
Prediction Mrkt Conference Presentation, 4 pp., dated Feb. 6, 2006.
UsableMarkets—markets, design, usability, research; Public Prediction Markets Heuristic Review: CorwdlQ; 9 pp., May 9, 2006.
Trendio; The founder of Trendio blogs to keep you informed of the latest developments on Trendio, to discuss the future of the site with you and to share some personal reflections, 2pp., dated Oct. 17, 2006.
Robin Hanson et al; Manipulators Increase Information Market Accuracy; pp. 1-11, dated Feb. 2, 2007.
Eric Benderoff; Chicago Tribune; Different Kind of Futures Market; 3 pp., dated Feb. 24, 2007.
Howard Wolinsky; Sun-Times News Group; Prediction market rolls with hunches; 1 pg., dated May 15, 2007.
Motoko Rich; The New York Times; Publisher to Let the Public Have a Vote on Book Projects; 3 pp., dated May 21, 2007.
The Cambridge-MIT Institute; PROJECTS, Innovation Futures UK; 3 pp, dated Mar. 3, 2007.
Ken Miguel; ABC7/KGO-TV/DT; Wisdom of Crowds; ABC7 Futures Market; 2 pp., dated Feb. 15, 2007.
Emile Servan-Schreiber et al.; "Presidential Reality Check," NewsFutures.com Prediction Markets; 6 pp, date unknown.
Incentive Market Prediction Games, Incentive Markets, Inc., 1 pg., dated 2003.
Common Knowledge Markets Overview, 7 pp., date unknown.
Net Exchange Expanding the Value of Commerce; White Papers; 4 pp., dated 2004.
NewsFutures Prediction Markets; Trading Uncertainty for Collective Wisdom, Learn More Selected Books and Articles, 4 pp., dated 2007.
NewsFutures; About the Company, NewsFutures in the News, pg. 2, dated 2004.
Inside-Out Markets; Putting market forces to work inside your business, 4 pp., date unknown.
Notification of the International Search Report and Written Opinion of the International Searching Authority for International Application No. PCT/US07/09383, mailed Nov. 7, 2007, 8 pp.
NetExchange Presents at Energy Venture Fair; Net Exchange presents innovative solutions that address challenges faced by the energy industry; 1 pg., dated Jun. 26, 2001.
News Futures Prediction Markets; Trading uncertainty for collective wisdom, 2 pp., dated Dec. 6, 2001.
Robin D. Hanson; IEEE Intelligent Systems, Trends & Controversies, Decision Markets, pp. 16-20, May/Jun. 1999.
Peter Bossaerts et al.; European Economic Review; Inducing Liquidity in Thin Financial Markets Through Combined-Value Trading Mechanisms; pp. 1-25, dated 2002.
Business Week; The Power of Us, Mass Collaboration on the Internet is shaking up business; 6 pp., dated Jun. 20, 2005.
Kilmartin, Liam, et al., Development of an Interactive Voice Response System for a GSM SMS based Share Price Server, DSP UK—Sandown Exhibition Centre, pp. 89-93, dated Dec. 31, 1997.
Friel, Dermot, et al., "An Automated Stock Price Delivery System Based on the GSM Short Message Service," IEEE, pp. 1591-1595 including Figure 3, dated 1998.
Nelson, Darin, et al., ('Design Issues in Multimedia Messaging for Next Generation Wireless Systems, pp. 98-103, dated 2001.
Cabral de Souza, Geraldo Marcelo, et al., Proceedings of the IASTED International Conference, Communications, Internet, & Information Technology, "A Gateway to Interconnect Corporate and Mobile Telephony Operator Networks for Two-way Sms Messages Interchange," pp. 449-453, dated Nov. 18, 2002.
Jack D. Glen, "Trading and information systems in two emerging stock market", East Asian Executive Reports, Dec. 15, 1994, vol. 16., Iss 12, pp. 1-4, dated Dec. 15, 1994.
Domowitz, I. et al., "Auctions as algorithms: computerized trade execution and price discovery", Journal of Economic Dynamics and Control, (J-Econ-Dyn-Control-Netherlands), Jan. 1994, vol. 18, No. 1, pp. 29-60.
Notification of Transmittal of the International Search Report and Written Opinion of the International Searching Authority, or the Declaration for International Application No. PCT/US06/28805, mailed Dec. 27, 2006, 6 pp.
Notification of the International Search Report for International Application No. PCT/US99/25793, mailed Aug. 25, 2000, 2 pp.
Preliminary Examination Report for International Application No. PCT/US99/25793, dated May 17, 2001, 4 pp.
Examination Report for European Patent Application No. 99965746.3, mailed Nov. 27, 2007, 7 pp.
Internet Printout: "Who We Are", Wall Street Survivor, http://www.wallstreetsurvivor.com/Public/Content/About.aspx, downloaded Jul. 9, 2009, 2 pp.
Internet Printout: "What is UMOO", UMOO Financial Entertainment, http://www.umoo.com/about_umoo.aspx, downloaded Jul. 9, 2009, 3 pp.
Australian Examiner's Report for Australian Application No. 2006272654, dated Jun. 24, 2009 (3 pages).
"NTRA All-Star Jockey Championship Special Wagers," dated unknown (3 pages).
"Wagering Information; Straight or Basic Wagers," Lone Star Park at Grand Prairie: Player's Guide, http://www.1onestarpark.comlbet_info.asp, printed May 8, 2007 (3 pages).
"Wagering Information; Straight or Basic Wagers," NTRA.com, http://www.ntra.com/news.asp?type=playthehorses&id=4799, printed May 8, 2007 (3 pages).
"Glossary of Terms," NTRA.com, http://www.ntra.com/news.asp?type=playthehorses&id=4797, printed May 8, 2007 (3 pages).
"The Basics of Horseplay," NTRA.com, http://www.ntra.com/news.asp?type=playthehorses&id=4795, printed May 8, 2007 (2 pages).
"Bet With the People Who Know Racing," Racing Daily Forum, Jul. 24, 2001 (15 pages).
"Quote of the Day; Bet of the Day," London Times, Jul. 30, 2003 (1 page).
The Patent Office Search Report from International Application No. GB 0320232.2, Dec. 17, 2003 (6 pages).
Scarne "Scarne's New Complete Guide to Gambling," Simon and Schuster, pp. 46-48 plus title and Copyright pages, dated 1961 (2 pages).
PCT Search Report for PCT/US04/09797, May 13, 2005 (9 pages).
Scarne "Scarne's New Complete Guide to Gambling", Simon and Schuster, pp. 132-133, 1974.
Daley, Ken. "Handicapping the Race; Bet on McGwire surging past Maris, Sosa fading at the wire"http://nl.newsbank.com/nIsearch/we/Archives?p_product=Dm&p_theme=dm&p_action=search&p_maxdocs= 200&p_ topdoc=1&p_text_direct-0=OED3DAE8C5FC5A3A&p_field_direct-O=documenUd&p_perpage=1O&p_sort=YMD_date: D&s_trackval=GooglePM>, dated Aug. 27, 1998.
The New York Times, PLUS: AUTO RACING; Winston Cup purse Increased by Nascar, accessed at: http://query.nytimes.com/gst/fullpage.html?res=9F03EOD81139F93AA15752COA9659C8B, published Jan. 29, 2003; (1 page).

The New York Times, HORSE RACING; Purse may Rise for Super Derby, accessed at: http://query.nytimes.com/gst/fullpage.htmi?res=950DE7D81F31F936A15755COA96F948260, published Jun. 25, 1989 (1 page).
PCT Search Report for PCT/US04/10069, Jun. 17, 2005 (9 pages).
Google, Definition of "purse" accessed at: http://www.google.com/search?h1=en&rls=GGLD,GGLD:2004-30,GGLD:en&defl=en&q=..., on May 9, 2008; (2 pages).
rec.gambling.sports faq, Frequently Asked Questions about Sports Betting, Last Modified Feb. 15, 1996, pp. 1-8.
Parimutuel Betting; Wikipedia reference; http://en.wikipedia.org/wiki/Parimutuel_betting; last modified Jan. 26, 2008 (7 pages).
PCT Notification of Transmittal of the International Search Report and the Written Opinion of the International Searching Authority for International Application No. PCT/US04/09796; Jul. 21, 2008 (7 pages).
International Search Report for International Application No. PCT/US04/09798; Sep. 8, 2005 (1 page).
Jon Kiele; "Caveat Emptor: Understanding the Dynamics of the Futures Market"; Electrical World, vol. 210, No. 9, Sep. 1996; pp. 1-5.
"Atlantic International Entertainment, Ltd. (AIEE) Announces Third License Agreement for Internet Casino Extension (ICE) Product with Imperiamedia, Ltd."; PR Newswire; Friday, Jun. 18, 1999; pp. 1 and 2.
Donnelly, Craig, "Philadelphia Park Cancels Races Again as More Workers Join Strike the Bensalem Track's Three Off-Track Betting Sites Are Still Operating. So is Its Television Show", Philadelphia Inquirer, Dec. 30, 1995, pg. C5, ProQuest.
"Big Names Raise Stakes in Internet Casinos", Evening Post, Aug. 4, 2001, p. 12.
International Preliminary Report on Patentability for International Application No. PCT/US06/28805, dated Jan. 29, 2008 (4 pages).
Office Action for U.S. Appl. No. 09/465,607, mailed Dec. 20, 2000, 5 pp.
Office Action for U.S. Appl. No. 09/465,607, mailed Sep. 12, 2001, 6 pp.
Office Action for U.S. Appl. No. 09/465,607, mailed Jun. 25, 2002, 6 pp.
Office Action for U.S. Appl. No. 09/465,607, mailed Jan. 14, 2003, 6 pp.
Office Action for U.S. Appl. No. 09/465,607, mailed Jun. 29, 2004, 6 pp.
Office Action for U.S. Appl. No. 09/465,607, mailed Jan. 6, 2009, 14 pp.
Office Action for U.S. Appl. No. 11/379,171, mailed Jan. 29, 2009, 14 pp.
Office Action for U.S. Appl. No. 11/279,997, mailed Jan. 14, 2009, 15 pp.
Examiner Interview Summary for U.S. Appl. No. 11/279,997, mailed Jul. 9, 2009, 2 pp.
Examiner Interview Summary for U.S. Appl. No. 11/279,997, mailed Jun. 22, 2009, 2 pp.
Office Action for U.S. Appl. No. 10/301,527, mailed Oct. 8, 2003, 6 pp.
Office Action for U.S. Appl. No. 10/301,527, mailed Jul. 28, 2004, 6 pp.
Office Action for U.S. Appl. No. 10/301,527, mailed Nov. 23, 2004, 5 pp.
Notice of Allowance for U.S. Appl. No. 10/301,527, mailed Apr. 25, 2005, 10 pp.
Office Action for U.S. Appl. No. 10/655,409, mailed Jan. 27, 2005, 14 pp.
Office Action for U.S. Appl. No. 10/655,409, mailed Aug. 11, 2005, 10 pp.
Office Action for U.S. Appl. No. 10/655,409, mailed Feb. 15, 2006, 17 pp.
Office Action for U.S. Appl. No. 10/655,409, mailed Sep. 7, 2006, 16 pp.
Office Action for U.S. Appl. No. 10/655,409, mailed Sep. 14, 2007, 22 pp.
Office Action for U.S. Appl. No. 10/655,409, mailed Jan. 28, 2009, 22 pp.
Office Action for U.S. Appl. No. 11/351,614, mailed Sep. 19, 2007, 11 pp.
Office Action for U.S. Appl. No. 11/351,614, mailed Oct. 2, 2008, 15 pp.
Office Action for U.S. Appl. No. 09/382,907, mailed Sep. 12, 2000, 11 pp.
Office Action for U.S. Appl. No. 09/382,907, mailed May 29, 2001, 9 pp.
Office Action for U.S. Appl. No. 09/382,907, mailed May 9, 2002, 9 pp.
Office Action for U.S. Appl. No. 09/382,907, mailed Apr. 30, 2003, 8 pp.
Notice of Allowance for U.S. Appl. No. 09/382,907, mailed Nov. 25, 2008, 13 pp.
Office Action for U.S. Appl. No. 11/189,262, mailed Jan. 11, 2008, 23 pp.
Office Action for U.S. Appl. No. 11/189,262, mailed Sep. 30, 2008, 15 pp.
USPTO Office Action for U.S. Appl. No. 11/351,614; Sep. 18, 2009 (12 pages).
USPTO Office Action for U.S. Appl. No. 11/189,262; Aug. 21, 2009 (19 pages).
USPTO Office Action for U.S. Appl. No. 10/667,755; dated Jan. 12, 2009 (19 pages).
USPTO Office Action for U.S. Appl. No. 10/667,755; dated May 14, 2008 (19 pages).
USPTO Office Action for U.S. Appl. No. 10/667,923; dated Aug. 2, 2005 (12 pages).
USPTO Office Action for U.S. Appl. No. 10/667,923; dated Dec. 1, 2006 (17 pages).
USPTO Advisory Action for U.S. Appl. No. 10/667,923; dated Feb. 28, 2007 (3 pages).
USPTO Office Action for U.S. Appl. No. 10/667,923; dated Aug. 31, 2007 (9 pages).
USPTO Office Action for U.S. Appl. No. 10/667,923; dated Jan. 28, 2008 (10 pages).
USPTO Advisory Action for U.S. Appl. No. 10/667,923; dated Apr. 16, 2008 (3 pages).
USPTO Office Action for U.S. Appl. No. 10/667,923; dated May 15, 2008 (11 pages).
USPTO Office Action for U.S. Appl. No. 10/667,923; dated Nov. 4, 2008 (13 pages).
USPTO Examiner Interview Summary Record for U.S. Appl. No. 10/667,923; dated Sep. 15, 2009 (4 pages).
USPTO Examiner Interview Summary Record for U.S. Appl. No. 10/667,755; dated Jul. 20, 2009 (4 pages).
Office Action for U.S. Appl. No. 10/822,484, mailed May 6, 2005, 5 pp.
Office Action for U.S. Appl. No. 10/822,484, mailed Nov. 7, 2005, 16 pp.
Office Action for U.S. Appl. No. 10/822,484, mailed May 31, 2006, 19 pp.
Office Action for U.S. Appl. No. 10/822,484, mailed Dec. 1, 2006, 8 pp.
Office Action for U.S. Appl. No. 10/822,484, mailed Jun. 5, 2007, 15 pp.
Office Action for U.S. Appl. No. 10/822,484, mailed Nov. 20, 2007, 15 pp.
Office Action for U.S. Appl. No. 10/822,484, mailed Jun. 17, 2008, 21 pp.
Advisory Action for U.S. Appl. No. 10/822,484, mailed Aug. 14, 2006, 3 pp.
Examiner Interview Summary for U.S. Appl. No. 10/822,484, mailed Mar. 22, 2007, 3 pp.
Examiner Interview Summary for U.S. Appl. No. 10/822,484, mailed Jul. 10, 2009, 4 pp.
USPTO Notice of Allowance and Examiner Interview Summary Record for Application No. 10/822,484; dated Oct. 1, 2009 (19 pages).
Examiner Interview Summary for U.S. Appl. No. 09/465,607, mailed May 24, 2001 (2 pp.).
Office Action for U.S. Appl. No. 11/379,171, mailed Oct. 6, 2009 (28 pp.).

Advisory Action for U.S. Appl. No. 09/382,907, mailed Sep. 3, 2003 (3 pp.).
USPTO Office Action for U.S. Appl. No. 08/620,906; dated May 15, 1998 (14 pp.).
USPTO Office Action for U.S. Appl. No. 08/620,906; dated Dec. 1, 1998 (9 pp.).
USPTO Office Action for U.S. Appl. No. 08/620,906; dated Jun. 7, 1999 (4 pp.).
USPTO Office Action for U.S. Appl. No. 09/184,571; dated Jun. 23, 2000 (13 pp.).
USPTO Office Action for U.S. Appl. No. 09/184,571; dated Jan. 23, 2001 (6 pp.).
USPTO Office Action for U.S. Appl. No. 09/184,571; dated Apr. 25, 2001 (5 pp.).
USPTO Notice of Allowance for U.S. Appl. No. 09/184,571; dated Nov. 4, 2002 (4 pp.).
U.S. Provisional Appl. No. 60/462,176, filed Apr. 11, 2003, in the name of Howard W. Lutnick et al (3 pp.).
USPTO Office Action for U.S. Appl. No. 11/279,997, mailed Nov. 10, 2009 (25 pages).
USPTO Office Action for U.S. Appl. No. 10/655,409, May 26, 2010 (13 pages).
USPTO Office Action for U.S. Appl. No. 11/189,262, Apr. 1, 2010 (19 pages).
USPTO Pre-Brief Appeal Conference Decision for U.S. Appl. No. 11/279,997, Jun. 3, 2010 (2 pages).
USPTO Pre-Brief Appeal Conference Decision for U.S. Appl. No. 11/379,171, Jun. 7, 2010 (2 pages).
International Preliminary Report on Patentability for International Application No. PCT/US07/09389, dated Oct. 22, 2008 (5 pages).
International Preliminary Report on Patentability for International Application No. PCT/US07/09383, dated Oct. 22, 2008 (6 pages).
International Preliminary Report on Patentability for International Application No. PCT/US04/09798, dated Oct. 1, 2005 (4 pages).
International Preliminary Report on Patentability for International Application No. PCT/US04/09796, dated Apr. 28, 2009 (4 pages).
USPTO Office Action for U.S. Appl. No. 09/660,296, Aug. 27, 2003 (10 pages).
USPTO Office Action for U.S. Appl. No. 09/660,296, May 18, 2004 (14 pages).
USPTO Advisory Action for U.S. Appl. No. 09/660,296, Oct. 6, 2004 (3 pages).
USPTO Office Action for U.S. Appl. No. 09/660,296, Dec. 30, 2004 (31 pages).
USPTO Office Action for U.S. Appl. No. 09/660296, Jun. 28, 2005 (25 pages).
USPTO Office Action for U.S. Appl. No. 09/660296, Jan. 30, 2006 (16 pages).
"A New Craze for Mar.'s Maddest: Online 'Trading' of NCAA Shares", Barbara Martinez, The New York Times Company: Abstracts, Mar. 8,1994 (1 page).
Film Finances, Inc. The World Leader in Completion Guarantees. Oct. 1999 Internet print-out (1 page).
Mukta Arts Limited; the Internet print-out; 1999 (20 pages).
"Film Venture; Funding the Next Generation of Filmmakers," Film Investors Group, (5 pgs) undated.
Lee, "Sport Marketing Strategies Through the Analysis of Sport Consumer Behavior and Factors 2000 Influencing Attendance," UMI Dissertation Services, (139 pgs) 2000.
Eng, "Producing New Opportunities," Presstime, (2 pgs) Feb. 2005.
Notification of Transmittal of the International Search Report and Written Opinion of the International Searching Authority, or the Declaration for International Application No. PCT/US2005/01276 (9 pgs), Dec. 18, 2006.
Notification of Transmittal of the International Search Report and Written Opinion of the International Searching Authority, or the Declaration for International Application No. PCT/US2006/19316 (6 pgs), Jan. 8, 2007.
Goliath Business Knowledge on Demand; Innkeepers USA Trust Announces 2001 Dividend Allocation; (1 pg) Jan. 24, 2002.
USPTO Office Action for U.S. Appl. No. 10/914,706, Feb. 21, 2008 (19 pgs).
USPTO Office Action for U.S. Appl. No. 10/914,467, Mar. 19, 2008 (25 pgs).
USPTO Office Action for U.S. Appl. No. 11/133,972, Mar. 31, 2008 (18 pgs).
USPTO Office Action for U.S. Appl. No. 10/914,528, Feb. 20, 2008 (13 pgs).
USPTO Office Action for U.S. Appl. No. 10/914,528, Apr. 20, 2009 (11 pgs).
USPTO Office Action for U.S. Appl. No. 10/914,467, Dec. 15, 2008 (14 pgs).
USPTO Office Action for U.S. Appl. No. 11/133,972, Dec. 23, 2008 (20 pgs).
US PTO Office Action for Application No. 12/408,370; 11 pages; Aug. 6, 2009.
Notice of Allowance for U.S. Appl. No. 10/914,528; 38 pages; Dec. 11, 2009.
Gaylord Entertainment, Warner Brothers pictures enters in to Co-Financing/production Pact, Sep. 14, 2000; Business Wire; Gaylord.
CINE-TEC Motion Picture Funding and Marketing Consultants, http://cine-tec.com/whatwedo.htm,2000 (CINE-TEC).
Notice of Allowance for U.S. Appl. No. 10/914,467; 38 pages; Jan. 28, 2010.
Notice of Allowance for U.S. Appl. No. 11/133,972; 22 pages; Nov. 25, 2009.
Michael C. McCabe; You have now entered the Bowie Bond Era; 1997 p. 8-16; www.freddiemac.com/finance/smm/july97/pdfs/mc-cabe.pdf (McCabe).
USPTO Office Action for U.S. Appl. No. 10/914,706, Nov. 4, 2008 (8 pages).
USPTO Notice of Allowance and Fees Due for U.S. Appl. No. 10/914,706, Mar. 5, 2009 (7 pages).
USPTO Notice of Allowance and Fees Due for U.S. Appl. No. 10/914,706, Apr. 16, 2009 (2 pages).
USPTO Notice of Allowance and Fees Due for U.S. Appl. No. 10/914,706, May 12, 2009 (3 pages).
USPTO Notice of Allowance and Fees Due for U.S. Appl. No. 10/914,706, Jun. 11, 2009 (2 pages).
USPTO Notice of Allowance and Fees Due for U.S. Appl. No. 10/914,706, Jul. 2, 2009 (2 pages).
Canadian Exam Report for Application No. 2533524, dated Jun. 7, 2010 (4 pages).
USPTO Notice of Allowance and Fees Due for U.S. Appl. No. 12/408,370, Mar. 30, 2010 (7 pages).
C. Edward Fee, The Costs of Outside Equity Control; Evidence from Motion Picture Financing Decisions, The Journal of Business, vol. 75, No. 4 (Oct. 2002), pp. 681-711 (Costs).
EP Examination and Search Report for Application No. 05705731.7 dated Dec. 18, 2008; 4 pages.
AU Examiners Report for Application No. 2005208563 dated Nov. 25, 2009; 3 pages.
AU Notice of Acceptance for Application No. 2005208563 dated Feb. 7, 2010; 3 pages.
Office Action for U.S. Appl. No. 11/279,997, mailed Aug. 10, 2010, 23 pp.
U.S. Appl. No. 10/667,755 filed Sep. 22, 2003; 34 pages.
U.S. Appl. No. 10/667,923 filed Sep. 22, 2003; 43 pages.
U.S. Appl. No. 09/660,926 filed Sep. 13, 2000; 38 pages.
U.S. Appl. No. 10/914,528 filed Aug. 9, 2004; 35 pages.
U.S. Appl. No. 10/914,706 filed Aug. 9, 2004; 33 pages.
U.S. Appl. No. 12/408,370 filed Mar. 20, 2009; 33 pages.
U.S. Appl. No. 10/655,409 filed Sep. 4, 2003; 20 pages.
U.S. Appl. No. 10/914,467 filed Aug. 9, 2004; 31 pages.
U.S. Appl. No. 11/133,972 filed May 20, 2005; 36 pages.
U.S. Appl. No. 12/614,610 filed Nov. 9, 2009; 26 Pages.
U.S. Appl. No. 12/709,067 filed Feb. 19, 2010; 27 pages.
U.S. Appl. No. 12/709,047 filed Feb. 19, 2010; 44 pages.
U.S. Appl. No. 12/705,059 filed Feb. 12, 2010; 29 pages.
U.S. Appl. No. 11/351,614 filed Feb. 9, 2006; 30 pages.
U.S. Appl. No. 09/465,607 filed Dec. 17, 1999; 22 pages.
U.S. Appl. No. 11/189,262 filed Jul. 25, 2005; 73 pages.
U.S. Appl. No. 11/279,997 filed Apr. 17, 2006; 65 pages.
U.S. Appl. No. 11/379,171 Apr. 18, 2006; 61 pages.
U.S. Appl. No. 08/620,906 filed Mar. 25, 1996; 31 pages.

U.S. Appl. No. 09/184,571 filed Nov. 2, 1998; 44 pages.
U.S. Appl. No. 10/301,527 filed Nov. 21, 2002; 44 pages.
U.S. Appl. No. 09/382,907 filed Aug. 25, 1999; 26 pages.
U.S. Appl. No. 10/822,484 filed Apr. 12, 2004; 26 pages.
Advisory Action for U.S. Appl. No. 10/655,409, mailed Nov. 17, 2005, 3 pp.
Pre-Brief Appeal Conference decision for U.S. Appl. No. 11/351,614; Jul. 7, 2009 (3 pages).
Examiner's Answer to Appeal Brief for U.S. Appl. No. 09/382,907, mailed Jul. 2, 2004, 17 pp.
Pre-Brief Conference Decision for U.S. Appl. No. 11/189,262, mailed Feb. 26, 2010, 2 pp.
Office Action for U.S. Appl. No. 10/822,484, mailed Dec. 13, 2004, 5 pp.
Pre-Brief Appeal Conference Decision for U.S. Appl. No. 10/822,484, mailed Jan. 16, 2009, 2 pp.
Notice of Allowance for U.S. Appl. No. 10/822,484, mailed Oct. 1, 2009, 18 pp.
Examiner Interview Summary Record for U.S. Appl. No. 12/614,610 dated Aug. 17, 2010; 3 Pages.
Pre-Brief Appeal Conference Decision for U.S. Appl. No. 11/279,997, mailed Jun. 3, 2010, 2 pp.
USPTO Examiner Interview Summary Record for U.S. Appl. No. 10/667,755; dated Nov. 9, 2009 (3 pages).
Notice of Allowance for U.S. Appl. No. 10/914,528; 3 pages; Mar. 1, 2010.
Office Action for U.S. Appl. No. 10/914,528; 7 pages; Jan. 23, 2009.
Notice of Allowance for U.S. Appl. No. 10/914,467, Feb. 26, 2010 (3 pgs).
Pre-Brief Appeal Conference Decision for U.S. Appl. No. 10/914,467, May 29, 2009 (2 pgs).
Office Action for U.S. Appl. No. 10/914,467, Feb. 1, 2008 (6 pgs).
Advisory Action for U.S. Appl. No. 10/914,467, Mar. 3, 2009 (2 pgs).
Notice of Allowance for U.S. Appl. No. 11/133,972; 2 pages; Mar. 1, 2010.
Pre-Brief Appeal Conference Decision for U.S. Appl. No. 11/133,972; 2 pages; Apr. 30, 2009.
USPTO Office Action for U.S. Appl. No. 11/189,262; Nov. 23, 2010; 20 pages.
USPTO Advisory Action for U.S. Appl. No. 10/655,409 dated Sep. 30, 2010; 3 pages.
USPTO Office Action for U.S. Appl. No. 11/351,614; Nov. 12, 2010; 24 pages.
AU Examination Report for Application No. 2007201720; 2 pages; Nov. 17, 2010.
Notice of Allowance for U.S. Appl. No. 12/614,610; Oct. 6, 2010; 62 pages.
Newswire; "Funbets.com Jumps into 2nd Place among Fantasy Sports Web Sites."; Dec. 15, 2000; pp. 1 and 2.
USPTO Office Action for U.S. Appl. No. 10/655,409 dated Dec. 13, 2010; 13 pages.
USPTO Office Action for U.S. Appl. No. 09/465,607; 32 pages; Dec. 16, 2010.
USPTO Office Action for U.S. Appl. No. 11/279,997; mailed Nov. 9, 2010 (22 pages).
USPTO Office Action for U.S. Appl. No. 11/379,171; Sep. 27, 2010; 16 pages.
Definition of dividend from www.wikipedia.org, revision as of Aug. 13. 2010 (obtained Dec. 21, 2010 at: http://en.wikipedia.org/w/index.php?title=Dividend&oldid=378636953) (7 pages).
JP Office Action for Application No. 2008-524053 dated Jan. 4, 2011; 9 pages (including English Translation).
USPTO Office Action for U.S. Appl. No. 12/709,067; Dec. 27, 2010; 23 pages.

* cited by examiner

SYSTEM AND METHOD FOR FORMING A FINANCIAL INSTRUMENT INDEXED TO ENTERTAINMENT REVENUE

RELATED APPLICATION

The present application is a continuation of U.S. patent application Ser. No. 12/408,370, filed on Mar. 20, 2009, now U.S. Pat. No. 7,774,258 which is a continuation of U.S. patent application Ser. No. 10/914,706, filed on Aug. 9, 2004 (now U.S. Pat. No. 7,567,931); which claims the benefit under 35 U.S.C. §119 of provisional application Ser. No. 60/537,325 filed Jan. 16, 2004, each of which is incorporated by reference herein in its entirety.

TECHNICAL FIELD OF THE INVENTION

This disclosure relates generally to systems and methods for financial investments. More specifically, the disclosure relates to a financial instrument indexed to entertainment revenue.

BACKGROUND OF THE INVENTION

Current entertainment companies are typically corporations or partnerships that fund, produce, or otherwise participate in the creation or organization of many entertainment events. These entertainment events normally require various amounts of funding based on a number of criteria. For example, if the entertainment event is a movie, then the level of funding may be based on the chosen director for the film, the selected actors, the special effects or Computer Generated Imagery (CGI), locations desired for the film, appropriate advertising, and many other factors. In another example, if the entertainment event is a concert, then the level of funding may be based on an arena, security at the arena, transportation costs for the performing artists, and such. Occasionally, funding for one of the events may be more difficult to obtain because of poor public or industry perception of the project, lack of information about or knowledge of the project, inaccessibility to the funding process by interested investors, possible exclusivity of the particular entertainment industry, the particular funding needs being too great for one or a few investors, or for any other reason. Once funding is obtained and the event is produced, created, hosted, or otherwise premiered, the entertainment company receives at least portion of the revenues. Typically, as in the case of movies, this portion is based on the ticket sales of the movie, less distributor fees.

SUMMARY OF THE INVENTION

In one embodiment, this disclosure provides a method for forming a securities bundle indexed to entertainment revenue. The example method includes determining a first funding amount for a first entertainment event. A second funding amount is determined for a second entertainment event. Next, a dividend schedule is determined for the first and second entertainment events. A securities bundle is formed at least partially based on the funding amounts and the dividend schedule, with the securities bundle comprising a first security and a second security and the first security associated with the first entertainment event and the second security associated with the second entertainment event.

In another embodiment, this disclosure provides a method for purchasing a securities bundle indexed to entertainment revenue. This example method includes selecting a securities bundle offered by a special-purpose entity, with the securities bundle comprising a first security and a second security and the securities bundle associated with a closing date. The first security is associated with a first entertainment event and the second security is associated with a second entertainment event. A return value is identified and associated with the securities bundle. A purchase price is identified and associated with the securities bundle. The selected securities bundle is then purchased at least partially based on the purchase price and the return value.

In yet another embodiment, this disclosure provides a method for providing an after-market for securities indexed to entertainment revenue. This example method includes identifying a securities bundle comprising a first and second security, with the first security associated with a first entertainment event and the second security associated with a second entertainment event. The first security is offered in an after-market for the buying price. A market price is determined for the first security in the after-market.

In a further embodiment this disclosure provides an electronic system for offering, purchasing, selling, trading, searching, or otherwise processing securities associated with entertainment events.

In another embodiment, a system and method is provided for trading the securities bundle that includes unbundling the securities bundle into the component securities for sales in a secondary market, such as an ECN. Moreover, futures contracts for one or more of the component securities may be traded on a futures exchange.

The invention has several important technical advantages. Various embodiments of the invention may have none, some, or all of these technical advantages. One technical advantage of the present invention is that it increases accessibility to the funding process through the use of systems architected into appropriate networks to connect investors with facilitators and those seeking to fund a project. This provides an opportunity for a wider range of investors to participate in at least some portion of the entertainment industry, whether movies, sports, music, or others. This network may also increase the reliability and accuracy of transactions, thereby increasing transaction volume. Moreover, this may provide for real-time communications among parties, thereby increasing the speed and efficiency of transaction processing. Further, the present invention may provide entertainment companies with a new source of financing for expensive or risky entertainment events. The present invention may create or allow for the creation of a secondary or after-market for the investments in the entertainment events. The present invention may also allow for a new data supplier industry responsible for compiling, storing, and providing information related to the entertainment events for investor research. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

Figure 1:
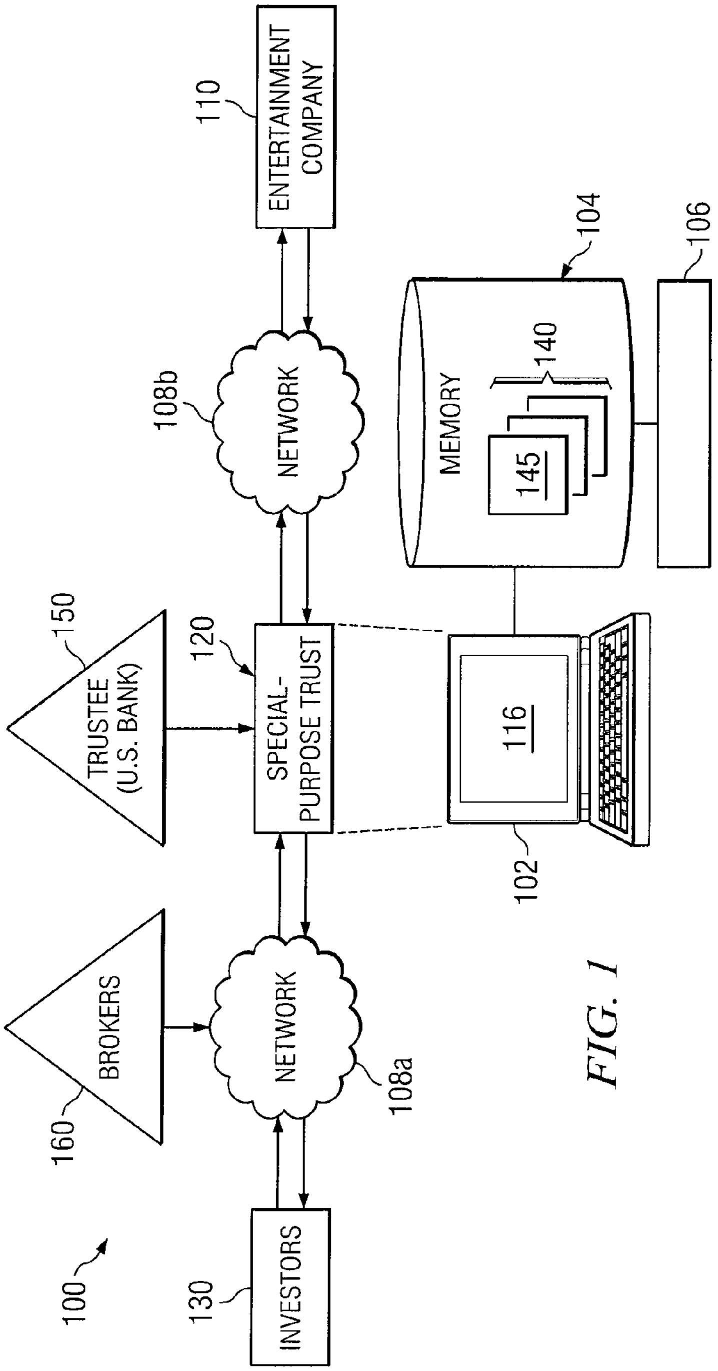
FIG. 1 illustrates an example system for offering one or more securities bundles indexed to entertainment revenue in accordance with one embodiment of the present disclosure.

FIG. 1 illustrates an example system 100 for forming, issuing, and/or offering a securities bundle 140 indexed to entertainment revenue for one or more entertainment events produced or sponsored by at least one entertainment company 110 or its affiliates in accordance with one embodiment of the present disclosure. For example, system 100 may be a financial market, electronic and/or manual, involving any portion of a life cycle of securities bundle 140. In certain embodiments, system 100 allows investors 130 to participate in a popular, yet often exclusive, industry, while attempting to receive a positive rate of return on investment. System 100 further provides a new—and reusable—source of funds for entertainment companies 110, thereby at least partially relieving those companies 110 from having to obtain alternative financing or keep a large cash reserve. In the illustrated embodiment, system 100 includes entertainment company 110, a special-purpose trust 120, and one or more investors 130. But system 100 contemplates any appropriate partial configuration such as, for example, entertainment company 110 directly offering securities bundle 140 to investors 130.

Entertainment company 110 is at least a portion of a business unit of any appropriate size that funds, produces, hosts, sponsors, presents or is otherwise financially involved in a plurality of entertainment events. Entertainment company 110 may reference any suitable business organization (including one or more divisions), corporation, partnership, individual, entity formed for the special purpose of one or more of the particular events, financial or commercial alliance among several businesses, or any subsidiary, affiliate, assignee, associate, employee, or agent thereof. For example, entertainment company 110 may be a movie studio, a music production company, a concert promoter, a sports team or league, or any other suitable company providing entertainment services or products. The entertainment events offered by entertainment company 110 (and at least partially represented in securities bundle 140) may be substantially similar, such as multiple concerts by one musical artist, or not, such as a plurality of different movies and television shows.

Investors 130 are individuals or entities qualified to participate in system 100 and to fund entertainment events offered by one or more entertainment companies 110. Generally, an investor 130 provides funds to entertainment company 110, in any appropriate manner, for the production and presentation of entertainment events by purchasing one or more securities bundles 140. For example, investor 130 may purchase securities bundles 140 from entertainment company 110 through special-purpose trust 120. Special-purpose trust 120 may provide the funds to the appropriate entertainment company 110 immediately or according to a suitable funding schedule. Once an investor 130 funds particular entertainment events associated with a securities bundle 140, the corresponding entertainment company 110 provides returns on the events to investors 130 according to a dividend schedule. In one embodiment, investor 130 may be allowed to select from a plurality of sets of bundles 140, with each set of securities bundles 140 associated with events distinct from other sets. This would allow investor 130 to select bundles 140 based on any suitable criteria such as, for example, rates of return, personal likes or dislikes, popularity, and others. Investor 130 may work through broker 160, or other similar individual or agent, to obtain additional research, knowledge, or agent-like functionality. The particular securities bundles 140 a particular investor 130 is allowed to purchase may depend upon the qualifications of the particular investor 130 within system 100.

Special-purpose trust 120 is one or more trusts, or other special-purpose entities, in which a trustee 150 or other person or entity fulfilling similar functions is interjected between investors 130 and entertainment company 110 for the execution of various entertainment financing purposes. Trustee 150 normally acts in the interest of investors 130. For example, trustee 150 may be a U.S. bank or other similar entity suitable to act in such a capacity. In one embodiment, special-purpose trust 120 may represent a plurality of separate trusts, with each trust associated with one entertainment company 110. Each trust may be registered pursuant to a registration statement filed with the U.S. Securities and Exchange Commission (SEC), with special-purpose trust 120 possibly registered as an investment company. In another embodiment, special-purpose trust 120 may be one trust associated with a plurality of entertainment companies 110. Regardless of the particular configuration or embodiment of the trust, special-purpose trust 120 generally raises funds for entertainment company 110 through the issuance of securities bundles 140.

A securities bundle 140 generally comprises any financial instrument the value of which is indexed to at least a portion of the entertainment revenue generated by one or more constituent entertainment events offered by an entertainment company 110. Each securities bundle 140 typically includes a plurality (or bundle) of securities 145. However, this disclosure contemplates that securities bundle 140 may include any other suitable security, trust certificate, or any other instrument, or any combination thereof. Accordingly, the use of "securities" is for illustrative purposes only and should not be considered a limiting embodiment of the present disclosure. Return on each of the bundled securities 145 is indexed to revenues from particular entertainment events as described in greater detail below.

All securities 145 forming part of the same securities bundle 140 are associated with events at least partially occurring (e.g., produced and/or presented) during a predetermined time period. This predetermined time period may be defined by, for example, a closing date and one or more dividend dates. It will be understood that each date may be a "hard" date, such as a specific calendar date, or a "soft" date, such as a certain amount of time after a relevant event begins or ends. Moreover, there may be multiple dividend dates for multiple securities 145, thereby providing a tiered investment. According to certain embodiments, entertainment company 110 may bundle securities 145 for many entertainment events during the set timeframe, thereby potentially diversifying risk and reducing volatility. Moreover, securities 145 for entertainment events offered by different entertainment companies 110 may be bundled in the same securities bundle 140. These entertainment companies 110 may be from the same or different entertainment industries. Each issuance may also be underwritten by brokers 160.

Proceeds from the issuance of securities 145 are paid to entertainment company 110, in accordance with a specified schedule based on any appropriate criteria, under a series of swaps, or other financial arrangements, entered into by special-purpose trust 120. Each swap entitles special-purpose trust 120 to receive a specified portion of the entertainment revenues from a particular event forming part of securities bundle 140. The revenues will typically derive from primary revenues such as, for example, company net profits from ticket sales, record sales, and others. However, the disclosure contemplates an alternative or supplemental source of secondary revenues as well, including video or DVD sales, basic or premium television, merchandising, licensing, international box office sales, and such.

In one embodiment, investment system 100 illustrated above is an electronic, communicably-coupled system distributed over network 108. Network 108 facilitates wireless or wireline communication between various components of the networked system. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Indeed, while illustrated as two networks, 108*a* and 108*b* respectively, network 108 may comprise any suitable number and combination of sub-networks without departing from the scope of this disclosure, so long as at least portion of network 108 may facilitate communications between computers 102, or any other suitable network devices.

One or more of the illustrated participants of system 100 may be or include a computer 102. For example, though computer 102 is illustrated as being associated with special-purpose trust 120, a plurality of computers 102 may be associated with entertainment company 110, investors 130, or other illustrated or non-illustrated participants, or any combination thereof. At a high level, as used in this document, the term “computer” is intended to encompass a personal computer, server pool, workstation, server, network computer, personal data assistant (PDA), dumb terminal, cell phone, pager, text message device, mainframe, or any other suitable data processing device. Moreover, “computer” and “user of computer” may be used interchangeably, as appropriate, without departing from the scope of this disclosure. In other words, investors 130, brokers 160, and/or employees of entertainment company 110 or trustee 150 may each be associated with a computer 102. The computer 102 may execute any operating system including UNIX, Windows, Linux, and others. The present disclosure contemplates computers other than general purpose computers as well as computers without conventional operating systems. Further, the computer 102 may include and/or execute unique software, hardware, firmware, or other logical components designed specifically for communications involving the purchase, issuance, or sale of securities bundles 140. For example, the components may be written in any appropriate computer language including C, C++, Java, Visual Basic, and others. Further, the components may be a single multi-tasked module or multiple modules. Further, the components may include features and functionality operable to implement any technique within the scope of this disclosure. In other words, such components may be developed, modified, or produced specifically for financial applications involving securities bundles 140.

Computer 102 may include a graphical user interface (GUI) 116, which comprises, at least, a graphical user interface operable to allow the user of the computer to interact with one or more processes executing on the computer. Generally, GUI 116 provides the user of the computer with an efficient and user-friendly presentation of data employed in order to initiate transactions or to perform asset-monitoring functions within an investment system. GUI 116 may comprise a plurality of displays having interactive fields, pull-down lists, and buttons operated by the user. In one example, GUI 116 presents an explorer-type interface and receives commands from the user. In another example, GUI 116 comprises a screen on a cell phone operable to present the phone user with data. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information and efficiently presents the information to the user. Network 108 can accept data from the user of the computer via the web browser (e.g., Microsoft Internet Explorer or Netscape Navigator) and return the appropriate HTML, Java, or eXtensible. Markup Language (XML) responses. The computer may also include an interface card (not illustrated) for communicating with other computer systems over network 108 such as, for example, in a client-server or other distributed environment. Generally, the interface card in computer 102 comprises logic encoded in software and/or hardware in a suitable combination and operable to communicate with the network. More specifically, the interface card may comprise software supporting one or more communications protocols and network hardware operable to communicate physical signals.

The computer may also include memory 104, which is any memory, hard drive, or database module, any of which may take the form of volatile or non-volatile memory including, without limitation, magnetic media, optical media, random access memory (RAM), read-only memory (ROM), removable media, or any other suitable local or remote memory component. Memory 104 may include any suitable data or module or not include the illustrated elements without departing from the scope of this disclosure. For example, memory may include logical representations of physical securities 145 for storing appropriate information associated with a securities bundle 140, the associated entertainment events, or other data. In another example, securities 145 may be logical data structures stored in memory 104. The computer may also include one or more processors 106 for executing instructions and manipulating data, such as data inputs and outputs, to perform the operations of computer 102 and local or remote software modules. It will be understood that reference to “processor” is meant to include multiple processors where applicable.

System 100 has several important technical advantages. One technical advantage of system 100 is that it increases accessibility to the funding process through the use of computers 102 architected using networks 108 to connect investors with facilitators and those seeking to fund a project. This provides an opportunity for a wider range of investors to participate in at least some portion of the entertainment industry, whether movies, sports, music, or others. This may also increase the reliability and accuracy of transactions, thereby increasing transaction volume. Moreover, this may provide for real-time communications among parties, thereby increasing the speed and efficiency of transaction processing.

In one aspect of operation, entertainment company 110 first determines the appropriate timeframe for funding entertainment events using a securities bundle 140. For example, this may include determining an expected closing date and one or more dividend dates for a securities bundle 140. One or more entertainment events to be produced and/or presented by the entertainment company 110 during this timeframe may be included in the securities bundle 140. Each such event corresponds with a security 145 in the securities bundle 140. In another example, entertainment company 110 selects and includes within a particular securities bundle 140 a fixed number of entertainment events to be funded.

Next, entertainment company 110 determines a funding amount for each of the entertainment events within the securities bundle 140. This funding amount may be a portion or all of the amount required to fund the production and/or presentation of a corresponding entertainment event. Entertainment company 110 then associates at least a portion of the funding amount with securities bundle 140. The entertainment company 110 may also establish a suitable return value for the securities bundle 140. The return value associated with a security bundle 140 may be a percentage, a dollar value, or any other suitable algorithm for determining the rate of return on a securities bundle 140. The return value and the purchase price for securities bundle 140 are determined based on the overall design process, including potential investors' 130 demand and willingness to pay for a portion of the expected revenue for the plurality of entertainment events.

Entertainment company 110 may also establish a suitable dividend schedule for the securities bundle 140. The dividend schedule may include one or more dividend dates. In one embodiment, the first dividend date may involve the investor 130 receiving a distribution indexed to the net revenue of first run U.S. sales associated with one or more relevant entertainment events. For example, the investor 130 holding security 145 indexed to a particular movie may receive a portion of the "rent," generally considered to be the net revenue of first run U.S. box office sales received by the movie studio for the movie after the distribution fees (i.e., exhibitor fees) have been paid. Each subsequent dividend date may involve proceeds indexed to the net revenues (or other secondary revenues) from the prior dividend date to the instant one. Moreover, each security 145 may provide non-financial—as well as financial—rewards such as, for example, on-set visitation rights, attendance at a movie premier, screening opportunities, preferred seating, admission on opening day, and others. The dividends may be determined in conjunction with the corresponding dividend dates.

As described above, securities bundle 140 includes a plurality of securities 145, with each security 145 associated with one entertainment event. For example, if a movie company desires 100 million dollars to fund the production of five movies, five securities 145 (one for each movie) will be included in securities bundle 140. The example movie company may then seek to raise the 100 million dollars by selling any suitable number of securities bundles 140. The details of the securities bundles 140 are provided to special-purpose trust 120, which then offers securities bundle 140 to one or more investors 130 for purchase.

As appropriate, investor 130 selects a securities bundle 140 for purchase. Investor 130 may select securities bundle 140 using any criteria including expected purchase value, personal preferences, financial data, participants in the associated entertainment events, and/or others. In certain embodiments, entertainment company 110 may offer a discount to an investor 130 on the purchase price of a security bundle 140. This discount may be based on loyalty points earned by the investor 130 in association with entertainment events offered by entertainment company 110. For example, an investor 130 may accumulate loyalty points based on purchasing tickets to entertainment events offered by entertainment company 110. These loyalty points may operate as credits towards the purchase of subsequent security bundles 140 offered by that company 110. The loyalty points may be validated as having been earned by the investor 130 via, for example, a credit card number used to purchase prior tickets, a validated bar code on a ticket stub, or any other validation technique.

Investor 130 may then purchase the securities bundle 140 based, at least in part, on the purchase price. In a particular embodiment, the investor 130 holds the securities bundle 140 until at least the first dividend date. Once the first dividend date is reached, the negotiated return values for the component securities 145 are used to calculate the proceeds or dividends distributed to the investor 130. In particular, the dividends are calculated by based at lest in part upon the determined revenue for an associated entertainment event and the negotiated return value for a corresponding security 145. For example, where the return value is a percentage, the dividend may be determined by multiplying the determined revenue by the negotiated return value. Typically, this return value is indexed to the net revenue (or "rent") of entertainment company 110 for the entertainment event associated with security 145. Returning to the example movie company, the return value may be indexed to the domestic box office receipts for one or more of the five movies up to the first dividend date. In certain circumstances, an investor 130 may sell all or a portion of a securities bundle 140 before and/or after the first dividend date.

Additional dividends may be paid to the holder of any given securities bundle 140 according to the remainder of the dividend schedule. The dividend schedule may terminate according to a milestone associated with a particular entertainment event in the bundle 140. For example, the dividend schedule may terminate a period of time after each movie is no longer being presented in a specified number of theaters, after each movie has been considered for the Academy Awards, or after any other suitable milestone event for the movie.

Figure 2:
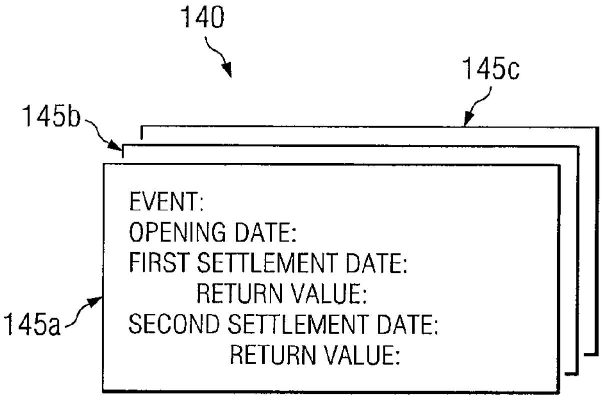
FIG. 2 is a high-level view of one embodiment of the securities bundle offered by the system in FIG. 1.

FIG. 2 illustrates an example securities bundle 140 in accordance with one embodiment of the present disclosure. Illustrated bundle 140 includes three securities **145*a*, 145*b*, and 145*c*, respectively. Each security 145 includes an associated entertainment event, an opening date and/or closing date of the event, and one or more dividend dates associated with a dividend schedule. For example, first security 145*a* includes a first dividend date associated with a first return value and a second dividend date associated with a second return value. As described above, first dividend date often follows the opening or premiere date, thereby allowing a first timeframe for determining returns on the event based, at least in part, on the first return value. Also, the second dividend date typically follows the first dividend date and is associated with a second return value. Each of second security 145*b* and third security 145*c* is associated with different entertainment events and may include similar dividend dates and return values. But this disclosure contemplates that second and third security 145*b* and 145*c* may have different dividend dates and return values from each other and first security 145*a***.

Figure 3:
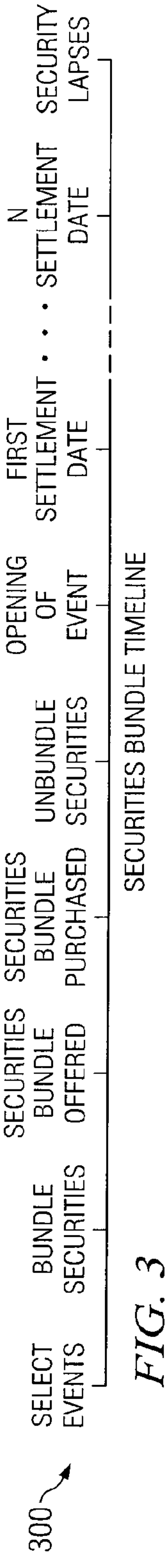
FIG. 3 illustrates an example timeline of a securities bundle in accordance with one embodiment of the present disclosure.

FIG. 3 illustrates an example timeline 300 of a securities bundle 140 in accordance with one embodiment of the present disclosure. Illustrated timeline 300 begins when a plurality of entertainment events are selected by entertainment company 110. For example, entertainment company 110 may select events at least partially occurring (e.g., produced and/or presented) within a predetermined period of time, or by using any other appropriate selection technique. Once selected, each event is associated with a security 145 and bundled into securities bundle 140. Securities bundle 140 is then offered to investors 130, typically through special-purpose trust 120. After any appropriate amount of negotiations or commercial discussions, one or more investors 130 purchases one or more securities bundles 140. In one embodiment, securities bundle 140 remains bundled throughout the dividend schedules of each component security 145. In alternative embodiments, securities bundle 140 may be unbundled into its component securities 145 at any suitable time. For example, securities bundle 140 may be automatically unbundled at the moment of purchase. In another example, securities bundle 140 may be unbundled at the first opening date or premiere of an associated entertainment event.

Each security 145 of a securities bundle 140 typically follows an particular path. For example, the entertainment event associated with a first security 145 premieres. As described above, this may be the premier of a movie, a first concert in a tour, or any other suitable opening The next substantive date in the life of each security 145 is the first dividend date. The first dividend date is normally a predetermined time after the opening or premier of the event and is used to determine a first return for investors 130 using the associated first rate of return. For example, first dividend date may occur one hundred days after the premier of the associated movie. After the first dividend date, there may be any number of future dividend dates (including zero) for determining subsequent returns using the same, similar, or different rates of return. Once the final dividend date has occurred and the final returns have been calculated and provided, security 145 lapses.

Figure 4:
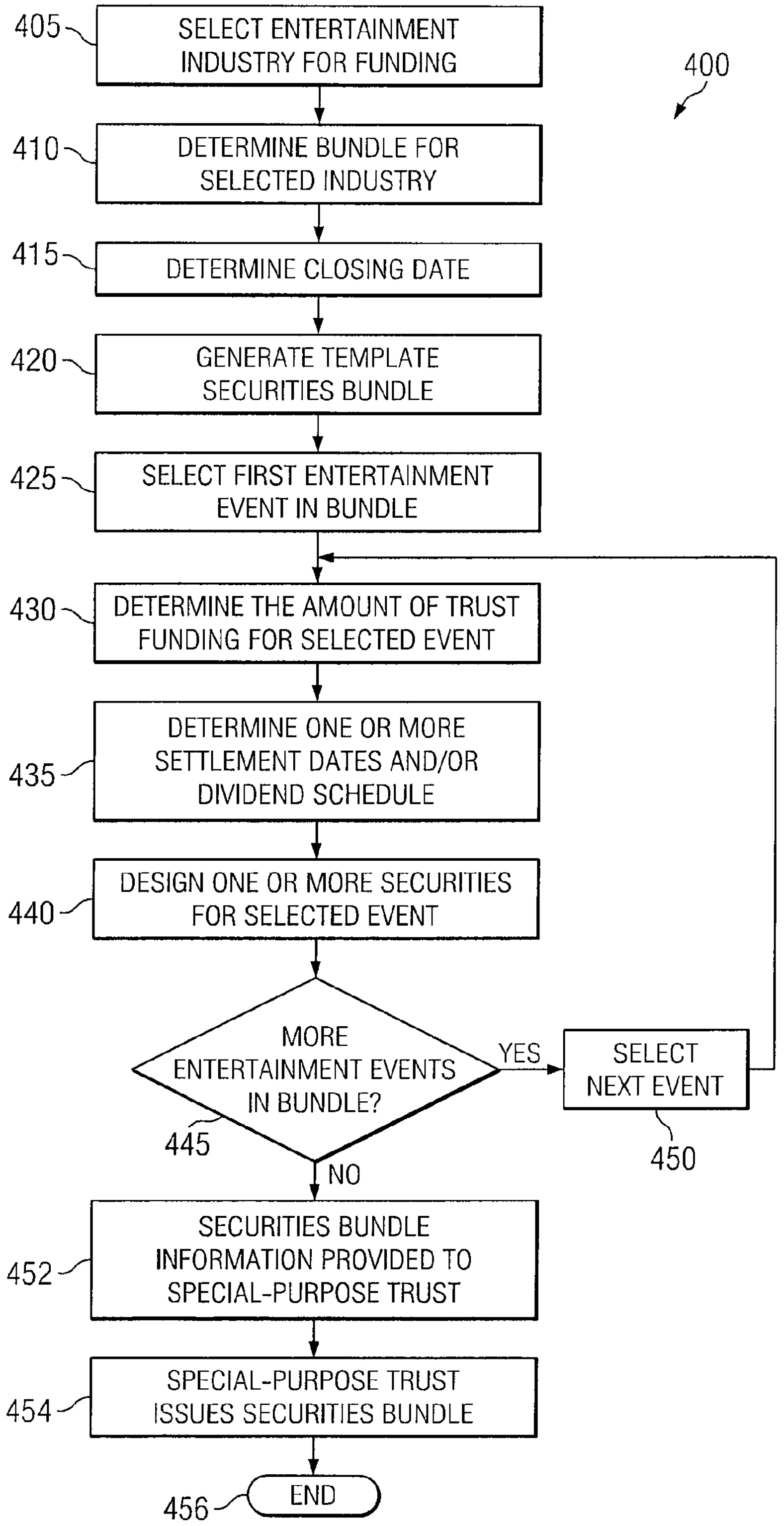
FIG. 4 illustrates an example method for forming a securities bundle indexed to entertainment revenue in accordance with one embodiment of the present disclosure.

FIG. 4 is a flowchart illustrating an example method 400 for creating or otherwise forming a securities bundle 140 that includes a plurality of securities 145 indexed to particular entertainment events in accordance with one embodiment of the present disclosure. Generally, method 400 describes an example technique, in which one or more entertainment companies 110, and other possible participants, forms securities bundle 140 to be indexed to entertainment revenue of certain entertainment events offered by the one or more entertainment companies 110. System 100 contemplates using any appropriate combination and arrangement of logical or physical elements or participants implementing some or all of the described functionality.

Method 400 begins at step 405, where entertainment company 110 selects the particular entertainment industry for funding. For example, entertainment company 110 may comprise a multimedia company with a plurality of entertainment subsidiaries for various types of entertainment events. Next, at step 410, entertainment company 110 determines a bundle 140 for the selected industry. Entertainment company 110 then determines an expected closing date for bundle 140 at step 415. A securities bundle template is then generated at step 420. Once the generic or empty securities bundle 140 has been generated or otherwise determined, entertainment company 110 then adds a plurality of entertainment events to the particular securities bundle 140 in steps 425 through 455.

At step 425, entertainment company 110 selects a first entertainment event for bundle 140. Next, entertainment company 110 determines the amount of funding desired for the selected event, at step 430. The funding amount comprises at least a portion of the cost for financing the entertainment event. Next, at step 435, entertainment company 110 determines one or more dividend dates and/or a dividend schedule for the particular security 145. Once the various parameters have been determined, entertainment company 110 compiles these parameters and designs one or more securities 145 or trust certificates for the selected event, at step 440. Next, at decisional step 445, entertainment company 110 determines if there are more entertainment events to be added to securities bundle 140. If there are more events to be bundled, then entertainment company 110 selects the next event at step 450 and method 400 returns to step 430. Once there are no more entertainment events to be bundled, entertainment company 110 provides the securities bundle 140 to special-purpose trust 120 at step 452, which then issues securities bundle 140 and the component securities 145 at step 454. The method terminates at step 456.

Figure 5:
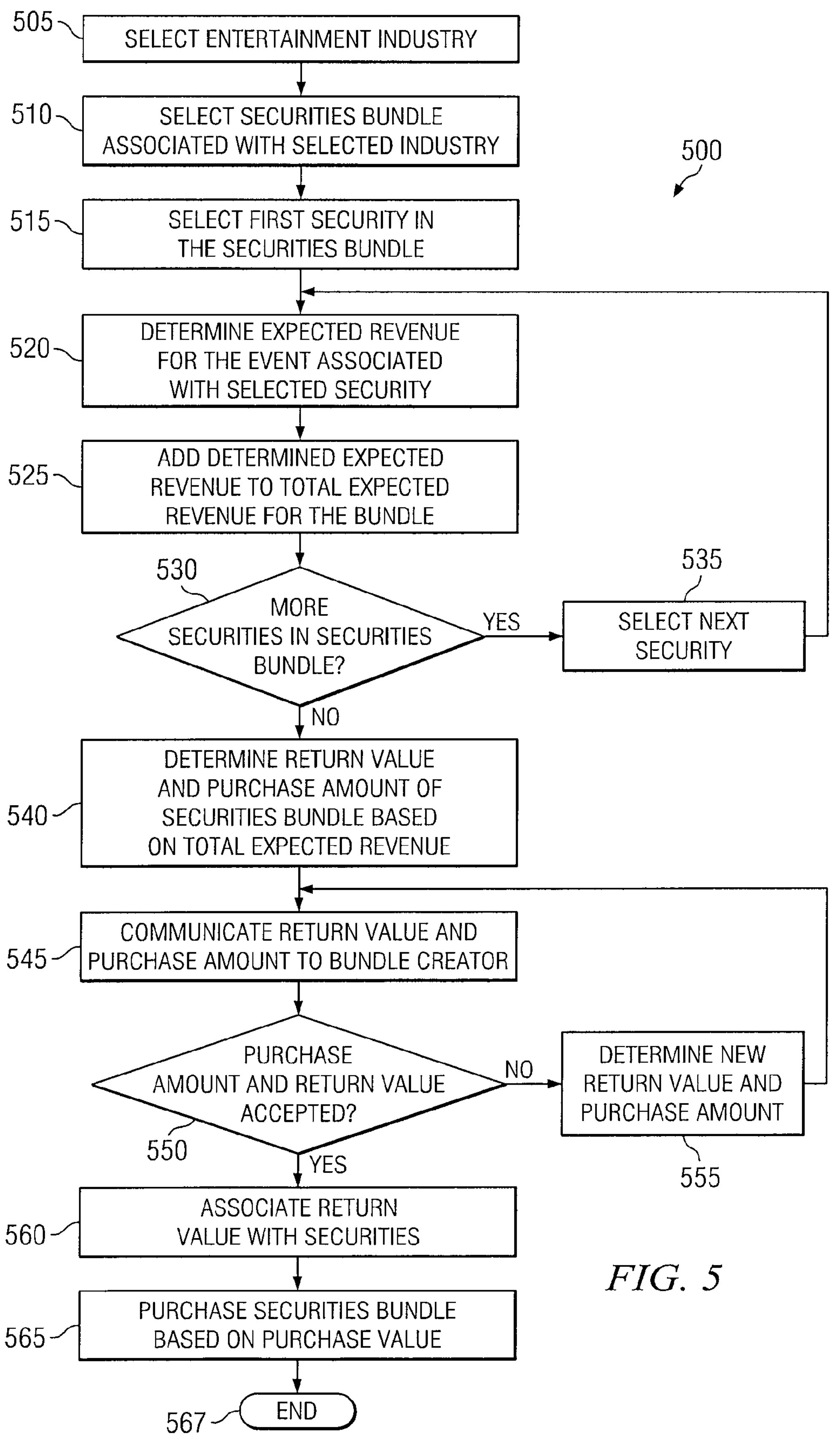
FIG. 5 illustrates an example method for purchasing a securities bundle indexed to entertainment revenue in accordance with one embodiment of the present disclosure.

FIG. 5 is a flowchart illustrating an example method 500 for purchasing or offering a securities bundle 140, which includes a plurality of securities 145 indexed to particular entertainment events in accordance with one embodiment of the present disclosure. At a high level, method 500 describes an example technique that includes selecting an offered securities bundle 140 and purchasing the selected bundle 140 for a market determined price. In one embodiment, method 500 begins once the special-purpose trust 120 has obtained the information for the formation of one or more securities bundles 140 from entertainment company 110. As with the previous flowchart, system 100 contemplates using any appropriate combination and arrangement of logical or physical elements implementing some or all of the described functionality.

Method 500 begins at step 505, where investor 130 selects an entertainment industry that he is interested in funding or otherwise financially participating in. Next, at step 510, investor 130 selects a particular securities bundle 140 associated with the selected industry. Investor 130 then selects a first security 145 in the selected securities bundle 140 at step 515. Next, an expected revenue for the event associated with the selected security 145 is then determined at step 520. The determined expected revenue is added to a total expected revenue for the selected bundle 140 at step 525. It will be understood that the total expected revenue is illustrative of merely one technique for determining the total return that investor 130 may expect from selected securities bundle 140.

Next, at decisional step 530, investor 130 determines if there are more securities 145 in securities bundle 140. If there are more securities 140, then investor 130 selects the next security 145 at step 535 and method 500 returns to step 520. Once there are no more securities 145 in securities bundle 140, then investor 130 determines a return value and a purchase amount of securities bundle 140 based, at least in part, on the determined total expected revenue at step 540. Next, at step 545, investor 130 communicates the determined return value to the bundle creator, such as entertainment company 110. Investor 130 typically also communicates the desired or expected purchase amount of selected securities bundle 140. If a communicated purchase amount and return value are not accepted by entertainment company 110 or special-purpose trust 120 then investor 130 determines a new return value and purchase amount at step 555 and method 500 returns to step 545. Once the purchase amount and return value have been successfully negotiated, then the return value is associated with the particular securities 145 at step 560. Next, at step 565, investor 130 purchases securities bundle 140 based on the accepted purchase value. The method terminates at step 567.

The preceding flowcharts and accompanying description illustrate only exemplary methods 400 and 500. In short, system 100 contemplates using any suitable technique for performing these and other tasks. Accordingly, many of the steps in these flowcharts may take place simultaneously and/or in different orders than as shown. Moreover, system 100 may use methods with additional steps, fewer steps, and/or different steps, so long as the methods remain appropriate.

Figure 6:
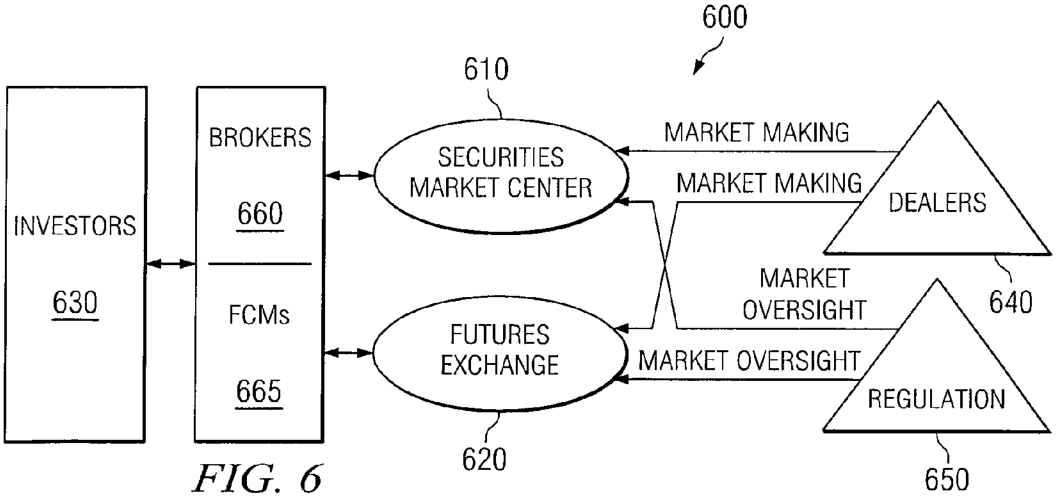
FIG. 6 illustrates an example after-market system for offering futures or secondary market transactions based on the securities bundles initially offered in the system of FIG. 1.

FIG. 6 illustrates an example after-market system 600 for offering futures or secondary market transactions based on the securities bundles 140 initially offered in the system of FIG. 1. Following each initial offering, securities bundle 140 may be automatically or manually split or unbundled into the component securities 145, which may be individually traded through after-market 600, such as a market center 600 (or "secondary market") or futures exchange 620. System 600 includes any suitable number and combination of processing and memory devices used to perform the features and functions described herein. System 600 increases the accessibility of market participants to the trading of securities bundles 140 and/or component securities 145.

According to certain embodiments, the securities 145 may be available for trading in the secondary market after the closing date or purchase date. The secondary market may include a market center 610, such as an electronic communications network (ECN) or Automated Trading System (ATS). Each securities market center 610 comprises all manner of order execution venues including exchanges, ECNs and ATSs. Each market center 610 maintains a bid and offer price in a given security 145 by having participants that stand ready, willing, and able to buy or sell at publicly quoted prices, also referred to as market center prices. Each market center 610 provides market center prices for particular securities 145. For example, a first market center may offer a particular bid price and/or offer price for particular securities 145, while another market center may offer a different bid price and/or offer price for the same securities 145. Certain market centers 610 may also charge a transaction cost in order to execute a trading order. Each market center 610 may also have different policies regarding the disclosure to market makers of various details of a trading order, such as, for example, the size of a trading order. Market center 610 may be customized or otherwise tailored to the entertainment industry or particular events. For example, the trading of a security 145 may be halted once an underlying entertainment event substantially begins, such as the opening weekend for a movie.

According to certain embodiments, the secondary market may also include dealers 640, regulators 650, brokers 660, and investors 630. Dealers 640 generally act as market-makers in both the market center and the futures exchange. Regulatory service providers 650 may provide surveillance of and other market oversight services to one or both example markets. Broker 660 may be any securities broker. Broker 660 may supply any suitable data involving a security 145 to a potential investor, and may facilitate the trading of securities 145 within system 600.

Futures contracts (or options on futures contracts) on each security 145 may also be listed on a futures exchange 620, for example the Cantor Exchange (CX), or other trading facility to enhance liquidity in the market for one or more securities 145. Futures exchange 620 may be registered with the Commodity Futures Trading Commission (CFTC). Generally, a futures contract is an agreement to buy or to sell an asset such as, for example, a loan, currency, commodity or any suitable financial instrument (e.g., a securities bundle 140, any underlying securities 145, or a right to payment based upon an entertainment event) at some time in the future, whereby the price of the asset is agreed upon at the time the agreement is made. Unlike a stock, which represents equity in a company and an asset that can be held for an indefinite time, the futures contract normally has a finite life. The futures contract can be used for hedging price-fluctuation risks or for taking advantage of price movements, rather than for the buying or selling of the actual asset.

In one embodiment, parties to a futures contract can agree on a fixed purchase price to buy the right to a payment that is indexed to some quantifiable parameter associated with an underlying entertainment event. For example, a first party could sell to a second party a futures contract in the right to a $1 payment per each $1 million of revenue earned by an underlying entertainment event. If the futures contract was sold for $50 and the entertainment event earned $55 million upon the settlement date, then the second party would have netted $5 from the first party. If the futures contract was sold for $50 and the entertainment event earned $45 million upon the settlement date, then the first party would have netted $5 from the second party. Of course, the values used in this example could vary. Moreover, the right to payment could be associated with any other quantifiable parameter associated with the underlying entertainment event during any suitable period of time (e.g., the number of seats sold to a particular movie at a particular theater; the number of showings of a particular movie; the number of theaters in which a particular movie was shown; the number of days that a particular movie was shown; revenue at a particular theater for a particular movie; etc).

In another embodiment, parties to a futures contract can agree on a fixed purchase price to buy a securities bundle 140 or any underlying securities 145 at the expiration of the contract. For example, the seller of this futures contract can agree to sell a securities bundle 140 or any underlying securities 145 to the buyer at expiration at the fixed sales price. As time passes, the contract's value changes relative to the fixed price at which the trade was initiated according to the value of the underlying securities bundle 140 or any underlying securities 145. This creates profits or losses for the traders. In most cases, delivery of the securities bundle 140 or the underlying securities 145 associated with the futures contract does not take place. Rather, the contract is cash-settled based upon, for example, the purchase price and the value of the underlying securities bundle 140 or securities 145 at the time of settlement.

In still other embodiments, parties may offer to take a position on the outcome of various events associated with an underlying entertainment event. For example, a first party may offer to take the position that a particular movie will gross over $50 million by the first dividend date. A counterparty may offer to take the position that the particular movie will not gross over $50 million by the first dividend date. A third party intermediary may accept both offers, settle the transaction, and pay the profits on the transaction according to a fixed mathematical calculation less a suitable commission (i.e., a return of 11 to 10 on a relatively even proposition). The fixed return determined for any particular transaction may be established by the third party intermediary according to the perceived likelihood of the event occurring. The third party intermediary may be any suitable participant in system 600.

System 600 may also include futures commission merchants 665 that are involved in the solicitation or acceptance of commodity orders for future delivery of commodities related to the futures contract market. A futures commission merchant 665 is able to handle futures contract orders as well as extend credit to customers wishing to enter into such positions. These include many of the brokerages that investors in the futures markets deal with.

Data related to the securities 145 or the associated futures contracts may be provided to potential investors 630 via a third-party data supplier (not illustrated). This data supplier may compile detailed information for the entertainment event, such as trading data, from a variety of sources. The details may include financial information such as current cost of production, current gross revenues, revenues per theater, dividends, and other fiscal data relevant to investing in a particular film. The details may also include non-financial information such as, for example, filming locations, genre, the director, actors, producers, and other persons or entities involved in the production of the example film, and other suitable industry data. In short, the third-party data supplier may provide any appropriate information to enable the potential investor to tailor a trade order based on certain financial and/or non-financial criteria.

Figure 7:
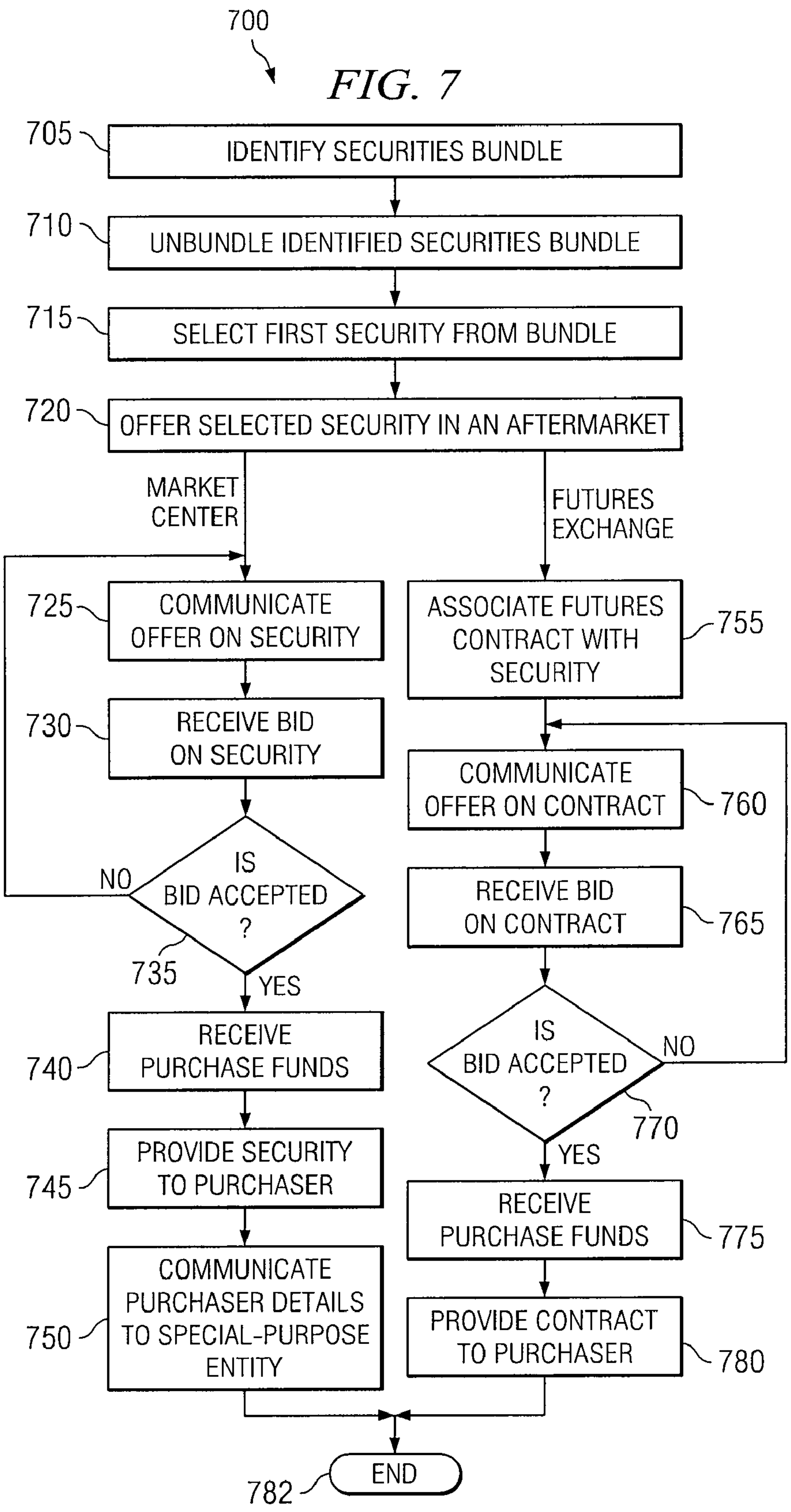
FIG. 7 illustrates an example method for transacting a security from a securities bundle in an after-market according to one embodiment of the present disclosure.

FIG. 7 illustrates an example method 700 for transacting a security 145 from securities bundle 140 in an after-market 600 according to one embodiment of the present disclosure. Generally, method 700 describes an example technique, in which investor 130 selects one or more securities 145 from securities 140 and individually offers the selected securities 145 in market center 610 and/or futures exchange 620. After-market 600 contemplates using any appropriate combination and arrangement of logical elements or players implementing or utilizing some or all of the described functionality. In short, after-market 600 contemplates using any suitable technique for performing these and other tasks. Accordingly, many of the steps in the following flowchart may take place simultaneously and/or in different orders than as shown. Moreover, after-market 600 may use methods with additional steps, fewer steps, and/or different steps, so long as the methods remain appropriate.

Method 700 begins at step 705, where a securities bundle 140 is identified. At step 710, the identified securities bundle 140 is automatically, dynamically, logically, or otherwise unbundled. Next, at step 715, investor 130 selects first security 145 from securities bundle 140. Investor 130 then offers the selected security in a particular after-market at step 720. It will be understood that this offer does not have to be binary. For example, investor 130 may offer the selected security through market center 610, while concurrently negotiating a futures contract through futures exchange 620.

If the selected security 145 is offered through market center 610, then negotiation and purchasing techniques may be utilized. For example, investor 130 may communicate an offer on the particular security 145 at step 725. Based on this offer, investor 130 may receive a bid on the particular security 145 at step 730. If investor 130 does not accept the bid at decisional step 735, then method 700 returns to step 725, where investor 130 may communicate the same or different offer on the particular security 145. Once the bid is accepted, investor 130 receives the purchase funds from the purchaser at step 740. Investor 130 then provides the particular security 145 or any representation or data thereof to the purchaser. Next, at step 750, the purchaser details are communicated to special-purpose trust 120 for subsequent dividend and returns.

Alternatively or in combination, the selected security 145 may be offered through a futures exchange. In this case, the securities bundle 140 or any underlying security 145 is associated with a potential futures contract at step 755. Next, at step 760, investor 130 communicates an offer on the futures contract. At step 765, investor 130 may receive a bid on the futures contract based on the communicated offer. If investor 130 does not accept the bid at decisional step 770, then method 700 returns to step 760. Once an agreement is reached on the futures contract associated with a particular security 145, then investor 130 receives the purchase funds at step 775. The futures contract is then provided to the purchaser at step 780. The method terminates at step 782.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A machine-implemented method, comprising:

determining, by an electronic trading system, a first entertainment event produced by a first entertainment company and funded by a first funding amount;

determining, by the electronic trading system, a first period of time related to the first entertainment event;

forming, by the electronic trading system, a first futures contract that grants a holder of the first futures contract at a date when the first period of time has ended a right to a payment based on a revenue related to the first entertainment event and the first period of time, in which the futures contract does not grant any equity right related to the first entertainment company to the holder;

selling the first futures contract through the electronic trading system to a first buyer for a first price, in which the sale does not include a sale to fund the first funding amount, and in which the sale does not include a sale by the first entertainment company;

receiving, by the electronic trading system, an offer to sell the first futures contract from the first buyer for a second price, in which the offer is received at a first time after the selling to the first buyer and before a start of the first period of time;

receiving, by the electronic trading system, a bid to buy the first futures contract from a second buyer for the second price, in which the bid is received at a second time after the selling to the first buyer and before the start of the first period of time;

in response to receiving the bid and the offer, facilitating, by the electronic trading system, an exchange of the first futures contract between the first buyer and the second buyer for the second price; and settling the first futures contract at a time when the first period of time has ended by providing the holder of the first futures contract with the payment based, in which the payment is not a payment from the first entertainment company.

2. The method of claim 1, in which the first futures contract grants the holder a plurality of rights to a plurality of respective payments at a plurality of respective dates.

3. The method of claim 2, in which at least one of the plurality of respective dates includes a date relative to at least one of a consideration of the first entertainment event for an aware and a reduction in a number of venues for the first entertainment event.

4. The method of claim 1, in which the first entertainment company comprises a movie studio and the first entertainment event comprises a movie.

5. The method of claim 1, in which the first entertainment company comprises a music production company and the first entertainment event comprises a music release.

6. The method of claim 1, in which the first entertainment company comprises a promoter and the first entertainment event comprises a concert.

7. The method of claim 1, in which the first funding amount comprises at least a portion of a cost for financing the first entertainment event.

8. The method of claim 1, in which the revenue includes a primary source of revenue related to the first entertainment event.

9. The method of claim 8, in which the first entertainment event includes a movie, and the primary source of revenue includes ticket sales.

10. The method of claim 1, in which the revenue includes a secondary source of revenue related to the first entertainment event.

11. The method of claim 10, in which the first entertainment event includes a movie, and the secondary source of revenue includes at least one of video and DVD sales of the movie, television revenue for the movie, merchandising revenue for the movie, and licensing revenue for the movie.

12. The method of claim 1, in which the right to the payment based on the revenue includes a right to a payment if the first entertainment event earns a threshold amount of money by the end of the period of time.

13. The method of claim 1, in which the right to the payment based on the revenue includes a right to a payment if the first entertainment event earns a threshold amount of money during the period of time.

14. The method of claim 1, in which the right to the payment based on the revenue includes a right to a payment based on which of a plurality of possible threshold amounts of money the first entertainment event earns.

15. The method of claim 1, in which the right to the payment includes a right to a payment if the first entertainment event does not earn a threshold amount of money by the end of the period of time.

16. The method of claim 1, in which the right to the payment includes a right to a payment if the first entertainment event does not earn a threshold amount of money during the period of time.

17. The method of claim 1, in which the period of time includes a premier date of the entertainment event.

18. The method of claim 1, in which the first entertainment event includes a movie, and the revenue include box office receipts.

19. The method of claim 1, further comprising:

determining, by an electronic trading system, a second entertainment event;

determining, by the electronic trading system, a second period of time related to the second entertainment event;

forming, by the electronic trading system, a second futures contract that grants a holder of the second futures contract at a date when the second period of time has ended a right to a second payment based on a revenue related to the second entertainment event and the second period of time;

selling the second futures contract through the electronic trading system; and settling the second futures contract at a time when the second period of time has ended by providing the holder of the second futures contract with the second payment.

20. The method of claim 19, further comprising forming a securities bundle including the first futures contract and the second futures contract, and in which selling the first futures contract and the second futures contract includes selling the securities bundle to the first buyer.

21. The method of claim 20, in which receiving the offer includes receiving an offer to sell the bundle, in which receiving the bid includes receiving a bid to buy the bundle, in which facilitating the exchange includes facilitating an exchange of the bundle.

22. The method of claim 20, in which receiving the offer includes receiving an offer to sell only the first futures contract separated from the bundle, in which receiving the bid includes receiving a bid to buy only the first futures contract separated from the bundle, in which facilitating the exchange includes facilitating the exchange of only the first futures contract separated from the bundle.

23. The method of claim 1, in which the holder of the first futures contract includes the second buyer.

24. An apparatus comprising:

a machine readable medium having stored thereon a set of instructions that when executed by a computing device causes the computing device to perform a method comprising:

determining a first entertainment event produced by a first entertainment company and funded by a first funding amount;

determining a first period of time related to the first entertainment event;

forming a first futures contract that grants a holder of the first futures contract at a date when the first period of time has ended a right to a payment based on a revenue related to the first entertainment event and the first period of time, in which the futures contract does not grant any equity right related to the first entertainment company to the holder;

selling the first futures contract to a first buyer for a first price, in which the sale does not include a sale to fund the first funding amount, and in which the sale does not include a sale by the first entertainment company;

receiving an offer to sell the first futures contract from the first buyer for a second price, in which the offer is received at a first time after the selling to the first buyer and before a start of the first period of time;

receiving a bid to buy the first futures contract from a second buyer for the second price, in which the bid is received at a second time after the selling to the first buyer and before the start of the first period of time;

in response to receiving the bid and the offer, facilitating an exchange of the first futures contract between the first buyer and the second buyer for the second price; and settling the first futures contract at a time when the first period of time has ended by providing the holder of the first futures contract with the payment based, in which the payment is not a payment from the first entertainment company.

25. The apparatus of claim 24 further comprising the computing device.

* * * * *